(12) United States Patent
Hillier

(10) Patent No.: US 7,809,817 B2
(45) Date of Patent: Oct. 5, 2010

(54) METHOD AND SYSTEM FOR DETERMINING COMPATIBILITY OF COMPUTER SYSTEMS

(75) Inventor: Andrew D. Hillier, Toronto (CA)

(73) Assignee: Cirba Inc., Richmond Hill (CA)

( * ) Notice: Subject to any disclaimer, the term of this patent is extended or adjusted under 35 U.S.C. 154(b) by 1013 days.

(21) Appl. No.: 11/535,355

(22) Filed: Sep. 26, 2006

(65) Prior Publication Data
US 2007/0250615 A1 Oct. 25, 2007

Related U.S. Application Data

(60) Provisional application No. 60/745,322, filed on Apr. 21, 2006.

(51) Int. Cl.
*G06F 15/173* (2006.01)
(52) U.S. Cl. ...................... 709/223; 713/100
(58) Field of Classification Search .................. 709/223
See application file for complete search history.

(56) References Cited

U.S. PATENT DOCUMENTS

| | | | | |
|---|---|---|---|---|
| 5,963,911 A * | 10/1999 | Walker et al. | ................... | 705/7 |
| 6,148,335 A * | 11/2000 | Haggard et al. | .............. | 709/224 |
| 6,412,012 B1 * | 6/2002 | Bieganski et al. | ........... | 709/232 |
| 6,487,723 B1 * | 11/2002 | MacInnis | ..................... | 725/132 |
| 6,564,174 B1 * | 5/2003 | Ding et al. | ................... | 702/186 |
| 6,654,714 B1 * | 11/2003 | Gentile et al. | ................. | 703/22 |
| 6,662,364 B1 | 12/2003 | Burrows et al. | | |
| 6,898,768 B1 | 5/2005 | Theodossy et al. | | |
| 2005/0044270 A1 | 2/2005 | Grove et al. | | |
| 2005/0209819 A1 * | 9/2005 | Wehrs et al. | ................ | 702/182 |
| 2007/0094375 A1 * | 4/2007 | Snyder et al. | ............... | 709/223 |
| 2007/0150479 A1 * | 6/2007 | Issa et al. | ...................... | 707/10 |

FOREIGN PATENT DOCUMENTS

WO    WO 2004/084083 A1    9/2004

OTHER PUBLICATIONS

Tanenbaum, Andrew S. et al; Distributed Systems: Principles and Paradigms; US Ed edition; Jan. 15, 2002; pp. 22-42, 326-336; Prentice Hall.
Hillier, Andrew; "A Quantitative and Analytical Approach to Server Consolidation" dated Jan. 2006, published at least as early as Feb. 3, 2006; CiRBA Inc.; Technical Whitepaper.
Hillier, Andrew; "Data Center Intelligence" dated Mar. 2006, published at least as early as Apr. 1, 2006; CiRBA Inc.; Technical Whitepaper.

(Continued)

*Primary Examiner*—John Follansbee
*Assistant Examiner*—Anthony Mejia
(74) *Attorney, Agent, or Firm*—Brett J. Slaney; John R. S. Orange; Blake, Cassels & Graydon LLP

(57) ABSTRACT

Systems and method for performing a consolidation analysis and visually representing the analysis are provided. The analysis is conducted by performing an audit, performing system compatibility and workload compatibility analyses using the audit data and rule sets. The results of the individual analyses are combined to create an overall compatibility cohabitation analysis and visual consolidation roadmap including scorecard information. The system and workload analyses may be performed to contribute to the overall co-habitation analyses, but also performed on their own.

22 Claims, 28 Drawing Sheets

OTHER PUBLICATIONS

Spellman, Amy et al.; "Server Consolidation Using Performance Modeling"; IT Professional; Sep./Oct. 2003; pp. 31-36; vol. 5, No. 5.
International PCT Search Report from PCT/CA2007/000675.

Mountain, J. & Enslow, Jr. P.; "Application of the Military Computer Family Architecture Selection Criteria"; ACM SIGARCH Computer Architecture News: 1978; pp. 3 to 17; vol. No. 6, Issue No. 6.

* cited by examiner

AUDIT NAME: COMPANY X
DESCRIPTION: Server Consolidation

REQUEST TYPE: SNMP

REQUEST PARAMETERS:

| NAME | VALUE |
|---|---|
| SNMP Version | 1 |
| Port | 3161 |
| Comm. String | public |

REQUEST TEMPLATES:
/Database_Settings/IETF_Network_Services
/Installed_Patches/Patch_Auditor
/System_Information/Security_Details
⋮

[ EDIT ]

AUDIT TARGETS:
Server A
Server B
Server C
Server D

[ EDIT ]

[ SAVE ] [ AUDIT ] [ CANCEL ]

FIGURE 10

| Property Name | Property Instance | Daily MIN | Daily 1st Quartile | Daily Median | ... | Daily Max. | Daily Average | HOURLY MIN | ... |
|---|---|---|---|---|---|---|---|---|---|
| disk free | /data | 46971097 | — | — |  | — | — | — |  |
| disk used | /data | 9158733 | — | — | ... | — | — | — | ... |
| ⋮ | ⋮ | ⋮ | ⋮ | ⋮ |  | ⋮ | ⋮ | ⋮ |  |

FIGURE 12

| DATA ELEMENT | CONDITIONAL FLAGS | SOURCE, TARGET INSTANCE | WEIGHT | DESCRIPTION | Remediation Cost | MUTEX |
|---|---|---|---|---|---|---|
| SYS_NAME |  |  | 0.5 | Diff. O/S | — |  |
| O/S_Kernel_Bits |  |  | 0.1 | Not same kernel bits | — |  |
| TIME_ZONE |  |  | 0.02 | Different time zones | — |  |
| ⋮ |  |  | ⋮ | ⋮ |  |  |

FIGURE 13

AUDIT NAME: COMPANYX.CH1

| TIMESTAMP | TARGETS | FAILED |
|---|---|---|
| MO/DAY/YEAR TIME | 4 | 0 |

[DELETE]   ←—152

REPORT CATEGORY:   REPORT TYPE:

[OPTIMIZATION ▽]   [SYSTEM COMPATIBILITY ▽] ←—156
                    WORKLOAD COMPATIBILITY
                    ⋮

154

REPORT PARAMETERS:
NAME        Value
ABC123      [UNIX ▽]        160
            CPU Utilization  → USAGE LIMIT  [ ]

158  TARGETS:

[REMOVE] | companyX.CH1 | AUDIT History | MO/DAY/YEAR TIME

[GENERATE] ←—164

SCI SCORECARD:
SORT ROW    SORT COLUMN

| SCI % | SERVER A | SERVER B | SERVER C | SERVER D |
|---|---|---|---|---|
| SERVER A | 100 | 90 | 83 | 57 |
| SERVER B | 90 | 100 | 79 | 57 |
| SERVER C | 83 | 79 | 100 | 90 |
| SERVER D | 52 | 52 | 52 | 100 |

DIFFERENCES: (MIGRATING A to D)

| DESCRIPTION | WEIGHT |
|---|---|
| DIFFERENT O/S Versions | 30% |
| DIFFERENT TIME ZONES | 2% |
| ⋮ | ⋮ |

FIGURE 16

DIFFERENCE DETAILS:

| Module | Object | Property | Instance | Baseline | Target | Weight | Remed. Cost |
|---|---|---|---|---|---|---|---|
| Config. Monitor | Name Service<br><br>Locale Settings | Value<br><br>Time Zone | ipnodes | files<br><br>US/ Eastern | files.dns<br><br>Canada/ Eastern | 2% | — |
| ⋮ | ⋮ | ⋮ | ⋮ | ⋮ | ⋮ | ⋮ | ⋮ |

FIGURE 17

WCI SCORECARD:

SORT ROW     SORT COLUMN

| WCI % | SERVER A | SERVER B | SERVER C | SERVER D |
|---|---|---|---|---|
| SERVER A | 100 | 76 | 73 | 66 |
| SERVER B | 84 | 100 | 70 | 60 |
| SERVER C | 82 | 70 | 100 | 39 |
| SERVER D | 80 | 60 | 39 | 100 |

WORKLOAD COMPATIBILITY REPORT   ☒

INPUTS:

| | |
|---|---|
| NORMALIZATION | — |
| TARGET SERVER | SERVER C |
| SOURCE SERVER | SERVER B |
| USAGE LIMIT | 75% |

182

WCI COMPUTATION SCORECARD:

184

| CRITERIA | VALUE | SCORE |
|---|---|---|
| Peak 4$^{th}$ Quartile (like) | 197 | 0 |
| Peak 4$^{th}$ Quartile (worst) | 198 | 0 |
| Peak 3$^{rd}$ Quartile (like) | 50 | 100 |
| Peal 3$^{rd}$ Quartile (worst) | 69 | 100 |
| Aggregate WCI | | 70 |

FIGURE 19

CHI SCORECARD:

| CHI % | SERVER A | SERVER B | SERVER C | SERVER D |
|---|---|---|---|---|
| SERVER A | 100 | 43 | 61 | 52 |
| SERVER B | 44 | 100 | 36 | 31 |
| SERVER C | 65 | 40 | 100 | 35 |
| SERVER D | 63 | 34 | 35 | 100 |

Differential Rule Definition

| Rule Type | Rule Specifier | Source | Target | Weight | Mutex Flag | Match Flag | Supress Flag | Remediation Cost | Description |
|---|---|---|---|---|---|---|---|---|---|
| a | b | c | d | % | Y/N | e | f | $ | g |

Figure 31

| | Rule Type | Rule Specifier | Source | Target | Weight | Mutex Flag | Match Flag | Suppress Flags | Remediation Cost | Description |
|---|---|---|---|---|---|---|---|---|---|---|
| 1 | AliasQuery | OS | | | 70% | | OS | | $1,200 | Different Operating Systems |
| 2 | AliasQuery | OS Version | | | 30% | | VER | OS | $320 | Different Operating System Versions |
| 3 | AliasQuery | Time Zone | | | 20% | | | | $320 | Systems are in Different Time Zones |
| 4 | AliasQuery | Total memory | | v | 5% | | | | $350 | Target Has Less Memory |
| 5 | UrlQuery | cirba-cm/ServerInformation/OSPatchLevel | | | 5% | | PATCH | OS VER | $160 | Different Patch Levels |
| 6 | UrlQuery | cirba-pa/patchesTable#* | | | 5% | Y | | OS VER | $80 | Patch Differences Between Systems |
| 7 | UrlQuery | cirba-cm/ServerInformation/OSKernelBits | | | 10% | | | OS | $80 | Not Running Same Kernel Bits |
| 8 | UrlQuery | cirba-cm/KernelParametersTable#* | present | absent | 5% | Y | | OS | $60 | Some Kernel Parameters are Absent |
| 9 | UrlQuery | cirba-cm/KernelParametersTable/Setting#SHMMAX | | v | 5% | | | | $80 | Maximum Shared Memory Settings Differ |
| 10 | UrlQuery | cirba-si/appInvTable.appInvTableTable/version#oracle | | | 5% | | | | $3,000 | Different Version of Oracle |
| 11 | UrlQuery | cirba-si/appInvTable.appInvTableTable/version#oracle | 9 | 8 | 4% | | | | $1,500 | Different Version of Oracle |
| 12 | UrlQuery | cirba-si/appInvTable.appInvTableTable/version#apache | | | 2% | | | | $80 | Different Version of Apache |
| 13 | UrlQuery | win32-os/Win32_OperatingSystem/ServicePackMajorVersion | | | 5% | | PATCH | OS VER | $160 | Different Service Pack Levels |
| 14 | UrlQuery | win32-quickfix/win-hotfix#* | present | absent | 5% | Y | | OS VER | $80 | Patch Differences Between Systems |
| 15 | UrlQuery | win32-os/Win32_StartupCommand#* | | | 2% | Y | | OS | $80 | Startup Commands are Different |
| 16 | UrlQuery | win32-misc/Win32_Environment/VariableValue#Path | | | 2% | | | OS | $80 | Global Path is Different |
| 17 | UrlQuery | win32-misc/Win32_Environment/VariableValue#Path <SYSTEM> | | | 2% | | | OS | $80 | System Path is Different |
| 18 | UrlQuery | win32-os/Win32_Service#* | present | absent | 5% | Y | | OS | $160 | Some Services not On Target |
| 19 | UrlQuery | win32-os/Win32_Service/Started | | | 1% | Y | | OS | $80 | Some Services not Started On Target |
| 20 | UrlQuery | win32-application/win-products#McAfee VirusScan Enterprise | present | absent | 5% | | | OS | $200 | McAfee Not On Target |

Figure 32

METHOD AND SYSTEM FOR DETERMINING COMPATIBILITY OF COMPUTER SYSTEMS

This application claims priority from U.S. provisional patent application No. 60/745,322 filed Apr. 21, 2006.

FIELD OF THE INVENTION

The present invention relates to information technology infrastructures and has particular utility in determining compatibility of computer systems in such infrastructures.

DESCRIPTION OF THE PRIOR ART

As organizations have become more reliant on computers for performing day to day activities, so to has the reliance on networks and information technology (IT) infrastructures increased. It is well known that large organizations having offices and other facilities in different geographical locations utilize centralized computing systems connected locally over local area networks (LAN) and across the geographical areas through wide-area networks (WAN).

As these organizations grow, the amount of data to be processed and handled by the centralized computing centers also grows. As a result, the IT infrastructures used by many organizations have moved away from a reliance on centralized computing power and towards more robust and efficient distributed systems. Distributed systems are decentralized computing systems that use more than one computer operating in parallel to handle large amounts of data. Concepts surrounding distributed systems are well known in the art and a complete discussion can be found in, e.g. "Distributed Systems: Principles and Paradigms"; Tanenbaum Andrew S.; Prentice Hall; Amsterdam, Netherlands; 2002.

While the benefits of a distributed approach are numerous and well understood, there has arisen significant practical challenges in managing such systems for optimizing efficiency and to avoid redundancies and/or under-utilized hardware. In particular, one challenge occurs due to the sprawl that can occur over time as applications and servers proliferate. Decentralized control and decision making around capacity, the provisioning of new applications and hardware, and the perception that the cost of adding server hardware is generally inexpensive, have created environments with far more processing capacity than is required by the organization.

When cost is considered on a seer-by-server basis, the additional cost of having underutilized servers is often not deemed to be troubling. However, when multiple servers in a large computing environment are underutilized, having too many servers can become a burden. Moreover, the additional hardware requires separate maintenance considerations, separate upgrades and requires the incidental attention that should instead be optimized to be more cost effective for the organization. Even considering only the cost of having redundant licenses, removing even a modest number of servers from a large computing environment can save a significant amount of cost on a yearly basis.

As a result, organizations have become increasingly concerned with such redundancies and how they can best achieve consolidation of capacity to reduce operating costs. The heterogeneous nature of distributed systems makes consolidation ever more difficult to achieve.

It is therefore an object of the following to obviate or mitigate the above-described disadvantages.

SUMMARY OF THE INVENTION

In one aspect, a method for determining compatibilities for a plurality of computer systems is provided comprising generating a configuration compatibility score for each pair of the plurality of systems based on configuration data obtained for each of the plurality of systems; generating a workload compatibility score for each pair of the plurality of systems based on workload data obtained for each of the plurality of systems; and generating a co-habitation score for each pair of the plurality of systems using the respective configuration compatibility score and workload compatibility score, the co-habitation score indicating an overall compatibility for each system with respect to the others of the plurality of systems.

In another aspect, a computer program is provided for determining compatibilities for a plurality of computer systems. The program comprises an audit engine for obtaining information pertaining to the compatibility of the plurality of computer systems; an analysis engine for generating a compatibility score for each pair of the plurality of systems based on the information that is specific to respective pairs; and a client for displaying the compatibility score on an interface.

In yet another aspect, a method for determining configuration compatibilities for a plurality of computer systems is provided comprising obtaining configuration data for each of the plurality of computer systems; assigning a weight to one or more parameter in the configuration data indicating the importance of the parameter to the compatibility of the plurality of systems; generating a rule set comprising one or more of the parameters; and computing a configuration score for each pair of the plurality of systems according to the weights in the rule set.

In yet another aspect, a method for determining workload compatibilities for a plurality of computer systems is provided comprising obtaining workload data for each of the plurality of systems; computing a stacked workload value for each pair of the plurality of systems at one or more time instance according to the workload data; and computing a workload score for each pair of the plurality of systems using the stacked workload values.

In yet another aspect, a graphical interface for displaying compatibility scores for a plurality of computer systems is provided comprising a matrix of cells, each the cell corresponding to a pair of the plurality of computer systems, each row of the matrix indicating one of the plurality of computer systems and each column of the matrix indicating one of the plurality of computer systems, each cell displaying a compatibility score indicating the compatibility of the respective pair of the plurality of systems indicated in the corresponding row and column, and computed according to predefined criteria.

BRIEF DESCRIPTION OF THE DRAWINGS

An embodiment of the invention will now be described by way of example only with reference to the appended drawings wherein:

FIG. 6 is a system compatibility index (SCI) matrix.

FIG. 7 is a workload compatibility index (WCI) matrix.

FIG. 8 is a co-habitation index (CSI) matrix for the SCI and WCI matrices of FIGS. 6 and 7.

FIG. 10 is an audit request template.

FIG. 12 is a table containing workload data.

FIG. 13 is a table containing a rule set used in generating an SCI matrix.

FIG. 14 is a screenshot of a program for generating compatibility reports.

FIG. 15 is an SCI matrix for an example environment having four server systems.

FIG. 16 is a table containing a summary of differences between a pair of systems in the environment.

FIG. 17 is a table containing details of the differences listed in FIG. 16.

FIG. 18 is a WCI matrix for the environment.

FIG. 19 is a workload compatibility report for a pair of systems being analyzed.

FIG. 20 is a CHI matrix for the environment.

FIG. 31 illustrates a general rule definition.

FIG. 32 shows an example rule set.

DETAILED DESCRIPTION OF THE INVENTION

Figure 1A:
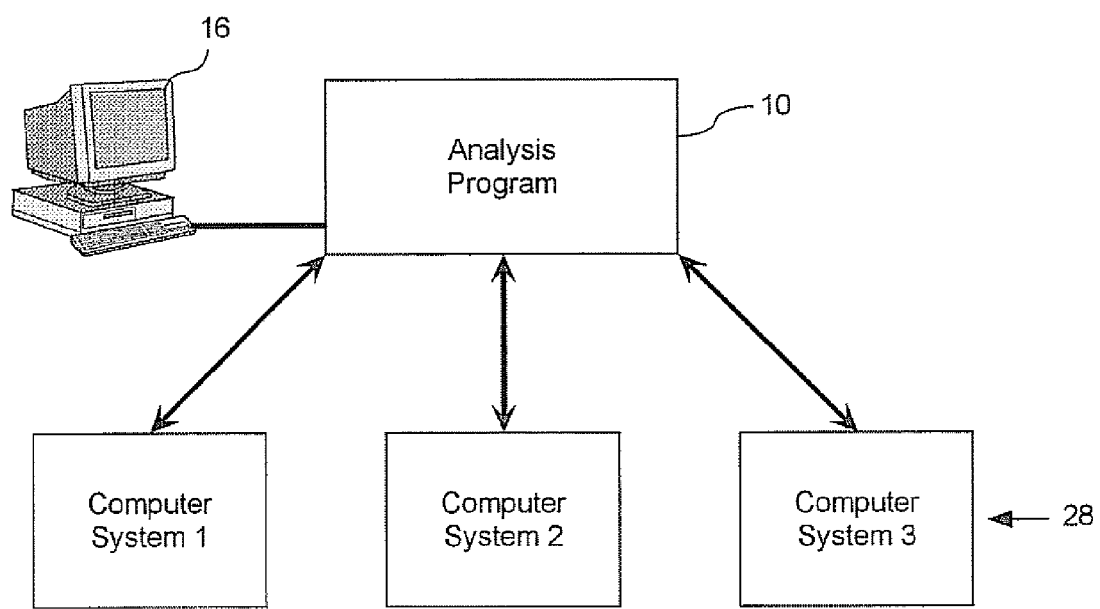
FIG. 1a is a schematic representation of a system for evaluating computer systems.

Referring therefore to FIG. 1a, an analysis program 10 is in communication with a set of computer systems 28 (3 are shown in FIG. 1a as an example). The analysis program 10, using a computer station 16, evaluates the computer systems 28 and provides a report showing how the systems differ. The computer systems 28 may be physical systems as well as virtual systems or models. A distinct data set is preferably obtained for each system 28.

Each data set comprises one or more parameter that relates to characteristics or features of the respective system 28. The parameters can be evaluated by scrutinizing program definitions, properties, objects, instances and any other representation or manifestation of a component, feature or characteristic of the system 28. In general, a parameter is anything related to the system 28 that can be evaluated, quantified, measured, compared etc.

Exemplary Environment

Figure 1B:
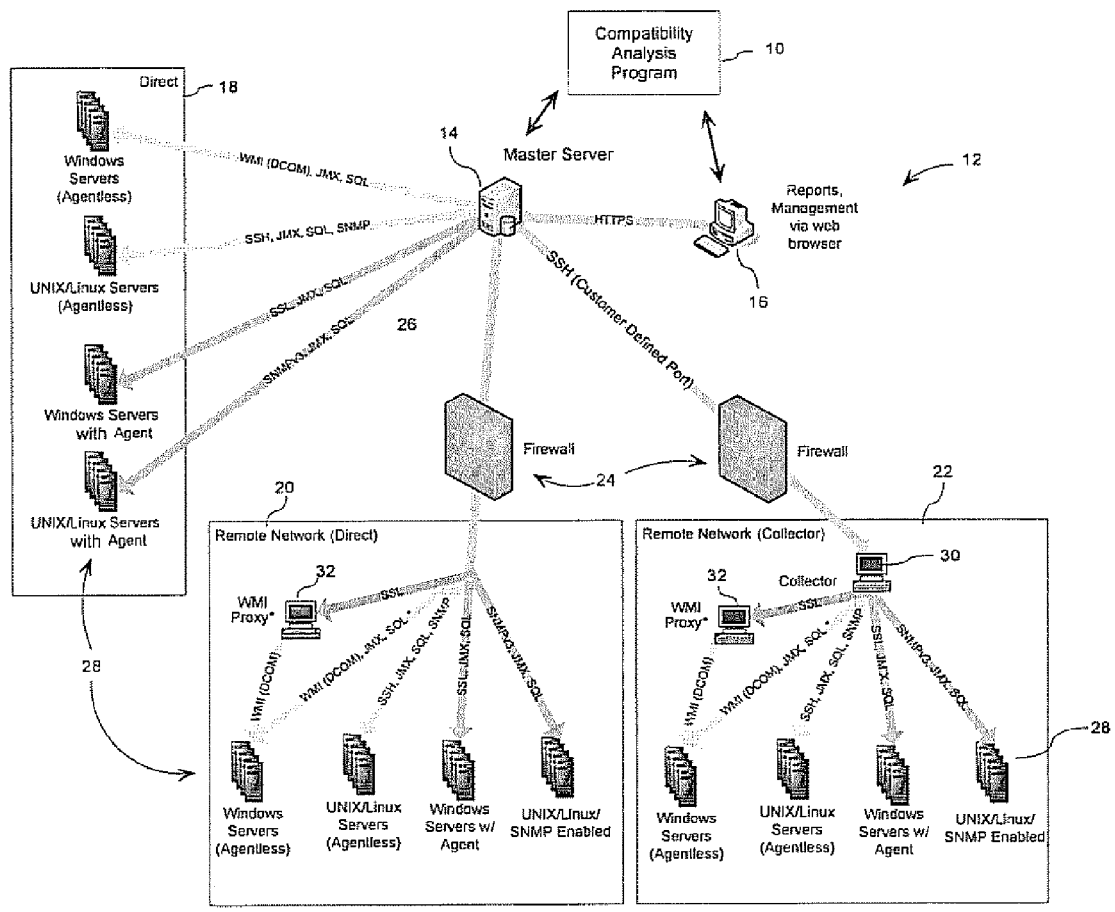
FIG. 1b is schematic representation of a network of systems analyzed by a compatibility analysis program.
Figure 2:
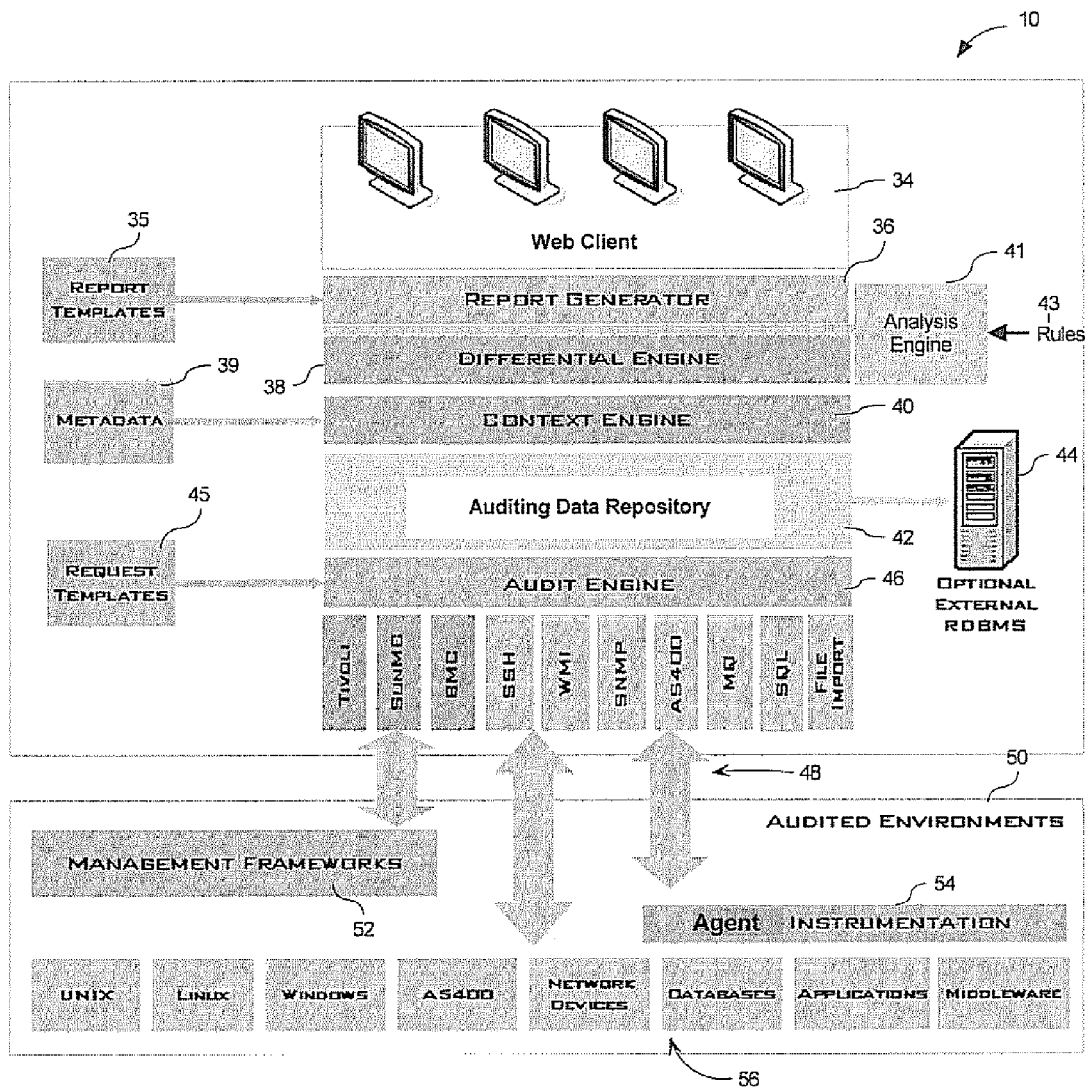
FIG. 2 is a schematic block diagram of an underlying architecture for implementing the analysis program of FIG. 1b.

Referring to FIGS. 1b and 2, a compatibility analysis program, generally referred to by numeral 10 for clarity is deployed to gather data from the exemplary architecture shown for a computing environment 12 (shown in FIG. 1b). The analysis program 10 analyzes the environment 12 to determine whether or not compatibilities exist within the environment 12 for consolidating systems such as servers, desktop computers, routers, storage devices etc. The analysis program 10 is preferably part of a client-server application that is accessible via a web browser client 34 running on, e.g. a computer station 16. The analysis program 10 operates in the environment 12 to collect, analyze and report on audited data for not only consolidation but other functions such as inventory analysis, change and compliance analysis etc. In the following examples, the systems are exemplified as servers.

As shown in FIG. 1b, the example environment 12 generally comprises a master server 14 that controls the operations of a series of slave servers 28 arranged in a distributed system. In the example shown, the master server 14 audits a local network 18 having a series of servers 28 some having local agents and others being agentless. The master server also audits a pair of remote networks 20, 22 having firewalls 24. The remote network 20 includes a proxy for avoiding the need to open a port range. The remote network 22 comprises a collector 30 for concentrating traffic through a single point allowing an audit to be performed through the firewall 24, and also comprises a proxy 32. The proxy 32 is used to convert between Windows™ protocols and UNIX™/Linux™ servers, and can also concentrate traffic. The proxy 32 may be required for auditing agentless Windows™ based server if the master server 14 is running another operating system such as UNIX™ or Linux™.

The master server 14 is capable of connecting to the slave servers 28 for performing audits of configuration settings, workload etc. and thus can communicate over several applicable protocols, e.g. simple network management protocol (SNMP). As shown, a computer station 16 running a web browser and connected to a web server (not shown) on the master server 14, e.g. over HTTP, can be used to operate the analysis program 10 in the environment 12. The analysis program 10 may reside on the master server 14 or may run on a remote server (not shown). The analysis program 10 can gather data as it is available or retrieve a block of data from the master server 14 either via electronic means or other physical means. As such, the analysis program 10 can operate in the environment 12 or independently (and remote thereto) so long as it can obtain audited data from the environment 12. The computer station 16 enables the analysis program 10 to display reports and gather user input for executing an audit or analysis.

Analysis Program

A example block diagram of the analysis program 10 is shown in FIG. 2. The flow of data through the program 10 begins as an audit engine 46 pulls audit data from audited environments 50. The data works its way up to the web client 34 which displays an output on a user interface, e.g. on computer system 16. The program 10 is preferably a client-server application that is accessed via the web client or interface.

An audit engine 46 communicates over one or more connections referred to generally by numeral 48 with audited environments 50 which are the actual systems 28, e.g. server machines, that are being analysed. The audit engine 46 typically uses data acquisition (DAQ) adapters to communicate with the end points (e.g. servers 28) or software systems that manage the end points (e.g. management frameworks 52 and/or agent instrumentation 54). The program 10 can utilize management framework adapters 52 in the audited environments 50 for communicating with ESM frameworks and agent instrumentation and for communicating with other agents such as a third party or agents belonging to the program 10. The audit engine 46 can also communicate directly with candidate and/or target systems 28 using agentless adapters (central arrow in FIG. 2) to gather the necessary audit information.

An auditing data repository 42 is used to store audit information and previous reports. The audit engine 46, using a set of audit templates 45, controls the acquisition of data that is used by the other software modules to eventually generate a set of reports to display on the interface 34. A context engine 40 utilizes metadata 39 stored by the program 10, which indicates the nature of the data, to filter out extraneous information.

An analysis engine 41 evaluates data compared in a differential engine 38 based on a set of rules 43. The analysis engine 41 performs the compatibility and, in this example, the consolidation analysis to determine if the environment 12 can operate with fewer systems 28.

The program 10 has a report generation tool 36 that utilizes a set of report templates 35 for generating custom reports for a particular environment 12. The report generation tool 36 utilizes the information generated by the analysis engine 41. Typically, the program 10 includes a web client 34 for communicating with a web interface (e.g. on computer system 16). The web interface allows a user to enter settings, initiate an audit or analysis, display reports etc.

System Compatibility Analysis Visualization

In the following examples, a source system refers to a system from which applications and/or data are to be moved, and a target server or system is a system to which such applications and/or data are to be moved. For example, an underutilized environment having two systems 28 can be consolidated to a target system (one of the systems) by moving applications and/or data from the source system (the other of the systems) to the target system.

Figure 3:
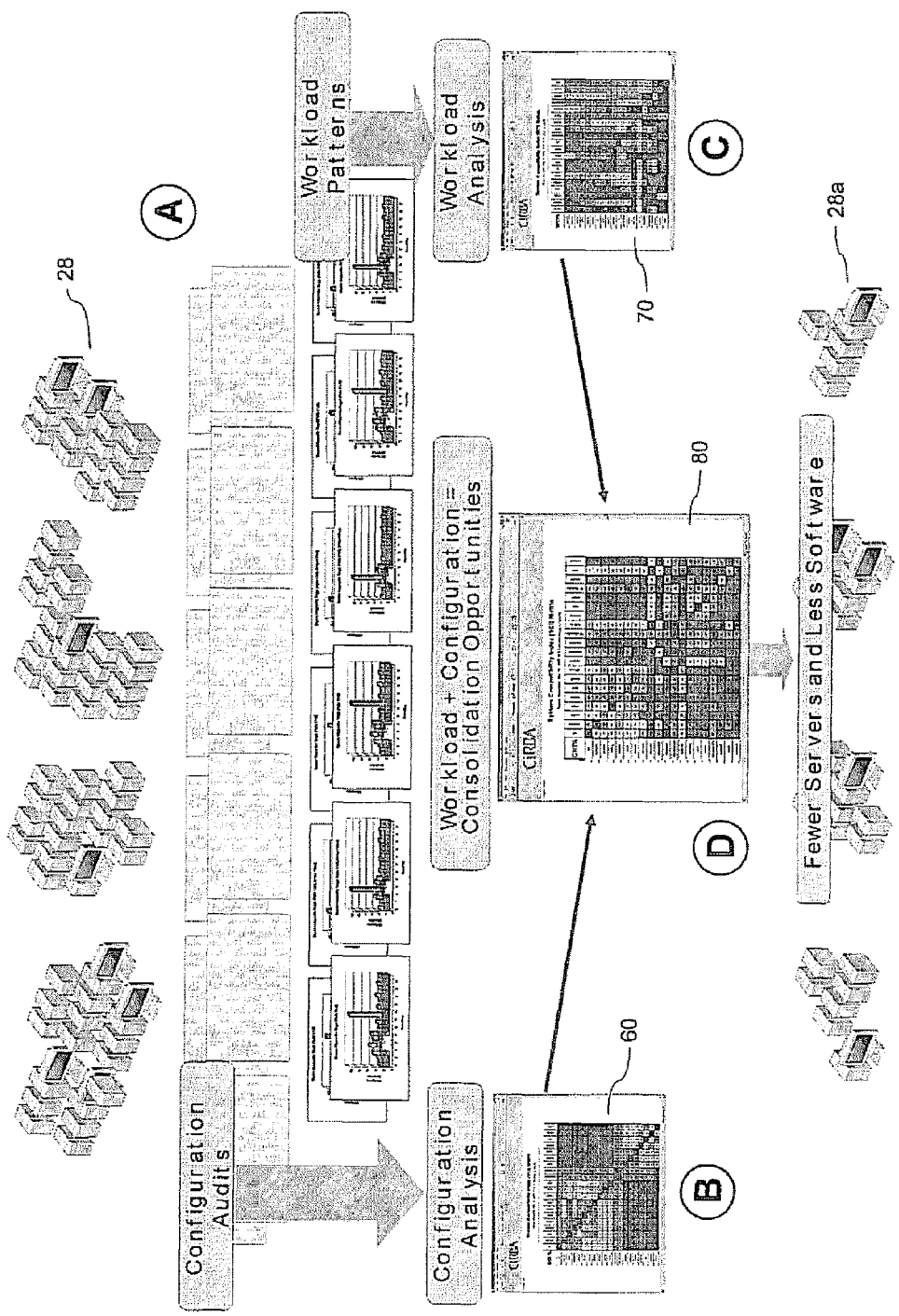
FIG. 3 is flow diagram illustrating a system consolidation analysis.

As best seen in FIG. 3, the systems 28 are audited in stage A to generate configuration reports and workload patterns, which are in turn used to create statistical scorecards in stages B, C and D.

The first stage, stage A, involves data collection, which includes the collection of detailed configuration and workload information from the environment 12. Stage A also includes data extraction to obtain the relevant configuration and workload data from the per-system data gathered in an audit according to compatibility rule sets and workload data types to obtain filtered per-system configuration and workload data sets. In addition, per-system benchmark data and usage limits are considered in Stage A for performing the workload analysis (Stage C).

Stages B and C are then performed using the data that has been collected. Stage B involves performing the system compatibility analysis to generate a system compatibility index (SCI) matrix 60 and Stage C involves performing the workload compatibility analysis to generate a workload compatibility index (WCI) matrix 70. The results from stages B and C are then used in stage D to perform an overall compatibility analysis which involves the generation of a co-habitation index (CHI) matrix 80 and its visual mapping of overall system compatibility. The analysis results may then be used to identify the best server consolidation candidates. It will be appreciated that the principles described herein support many strategies and consolidation is only one example.

Objectives

Figure 4:
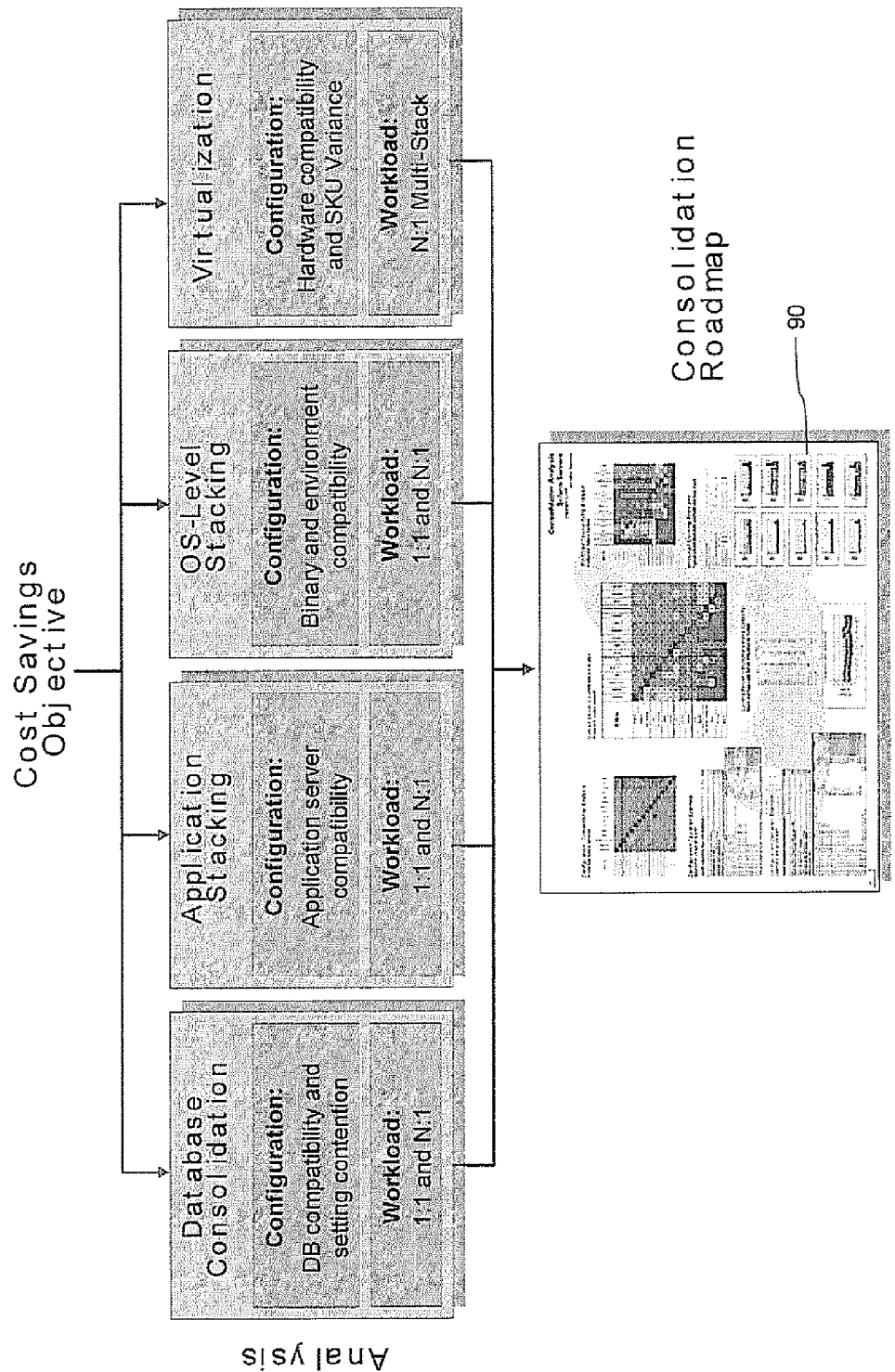
FIG. 4 is a flow diagram illustrating strategies for a server consolidation analysis.

From an analysis perspective, as shown in FIG. 4, a cost-savings objective can be evaluated on the basis of certain strategies such as, but not limited to, database consolidation strategies, application stacking strategies, operating system (OS) level stacking strategies and virtualization strategies that can also be visualized graphically using a comprehensive consolidation roadmap 90 incorporating the SCI 60, WCI 70 and CHI 80 matrices as will be explained in greater detail below.

System Configuration Compatibility Visualization

A configuration analysis in Stage B of N systems 18 computes N×N system compatibility scores by individually considering each system 18 as a consolidation source and as a target. Preferably, the scores range from 0 to 100 with higher scores indicating greater system compatibility. The analysis will thus also consider the trivial cases where systems are consolidated with themselves and would be given a maximum score, e.g. 100. For display and reporting purposes, the scores are preferably arranged in an N×N matrix form.

Figure 6:
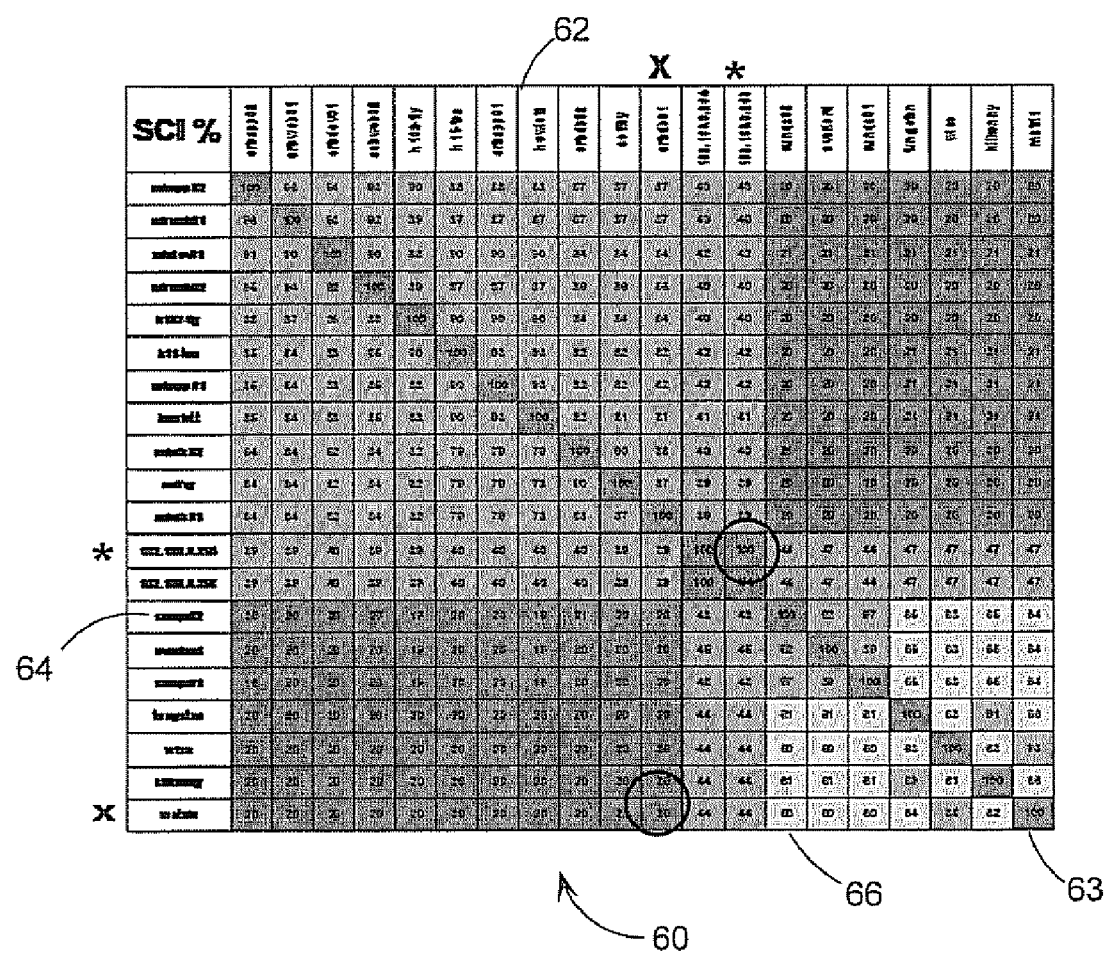

An example of an SCI matrix 60 is shown in FIG. 6. The SCI matrix 60 provides an organized graphical mapping of system compatibility for each source/target system pair on the basis of configuration data. The SCI matrix 60 shown in FIG. 6 is structured having each server 28 in the environment 12 listed both down the leftmost column 64 and along the uppermost row 62. Each row represents a consolidation source system, and each column represents the possible consolidation target. Each cell contains the score corresponding to the case where the row system is consolidated onto the column (target) system.

The preferred output shown in FIG. 6 arranges the servers 28 in the matrix such that a 100% compatibility exists along the diagonal 63 where each server is naturally 100% compatible with itself. The SCI matrix 60 is preferably displayed such that each cell 66 includes a numerical score and a shade of a certain colour. As noted above, the higher the score (from zero (0) to one hundred (100)), the higher the compatibility. The scores are pre-classified into predefined ranges that indicate the level of compatibility between two systems 18. Each range maps to a corresponding colour or shade for display in the matrix 60. For example, the following ranges and colour codes can be used: score=100, 100% compatible, dark green; score=75-99, highly compatible, green; score=50-74, somewhat compatible, yellow; score=25-49, low compatibility, orange; and score=0-24, incompatible, red.

The above ranges are only one example. Preferably, the ranges can be adjusted to reflect more conservative and less conservative views on the compatibility results. The ranges can be adjusted using a graphical tool similar to a contrast slider used in graphics pro-rams. Adjustment of the slider would correspondingly adjust the ranges and in turn the colours. This allows the results to be tailored to a specific situation.

It is therefore seen that the graphical output of the SCI matrix 60 provides an intuitive mapping between the source/target pairs in the environment 12 to assist in visualizing where compatibilities exist and do not exist. In FIG. 6, it can be seen that the server pair identified with an asterisk (*) and by the encircled cell indicates complete compatibility between the two servers for the particular strategy being observed, e.g. based on a chosen rule set. It can also be seen that the server pair identified with an X and the encircled cell at the corresponding row/column crossing comprises a particularly poor score and thus for the strategy being observed, the servers 28 in that pair are not very compatible.

Figure 5:
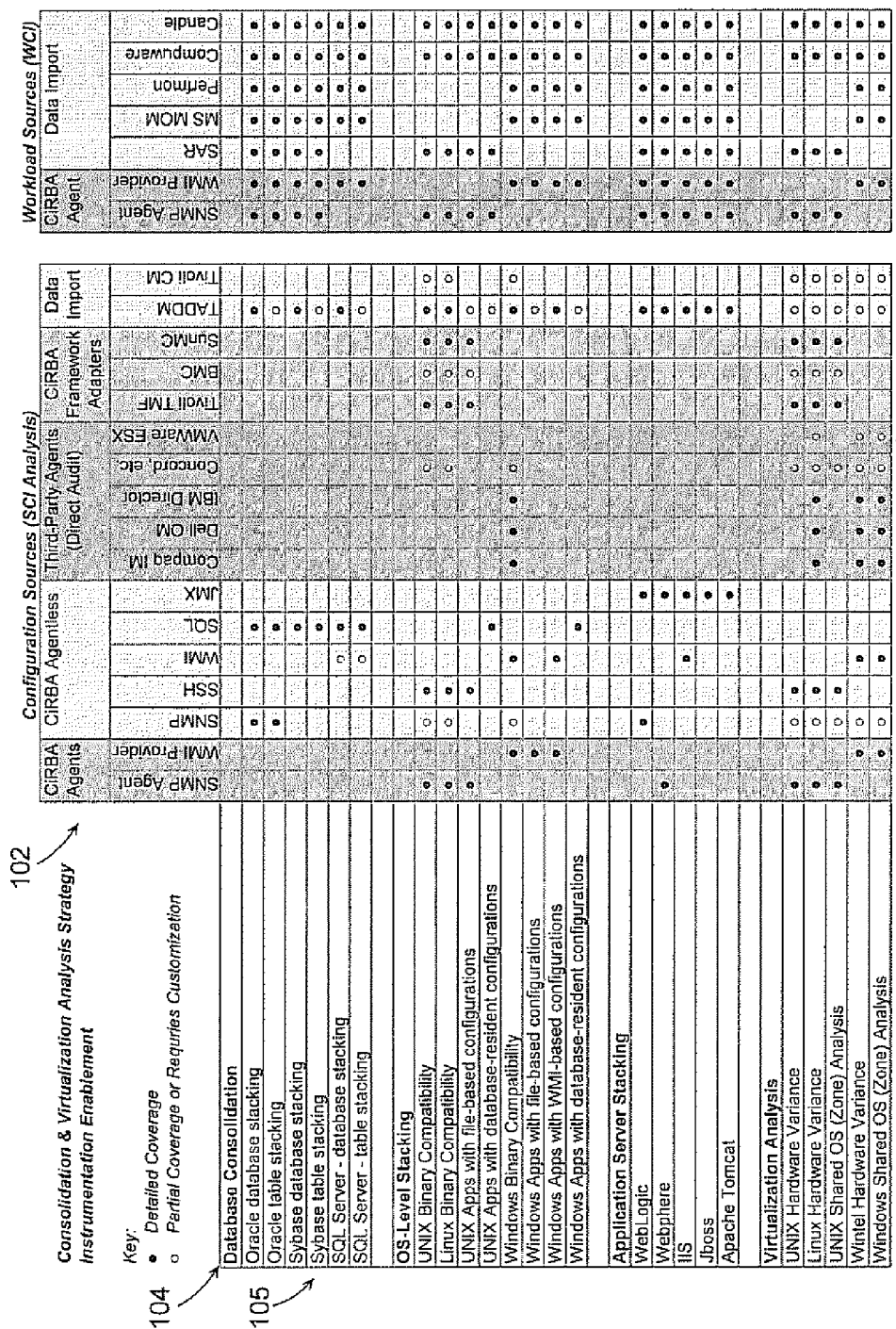
FIG. 5 is a table illustrating data enablement for system consolidation and virtualization.

The scores are calculated based on configuration data that is acquired through a configuration audit performed by the analysis program 10. The data is acquired using tools such as the table 100 shown in FIG. 5 that illustrate the various types of configuration settings that are of interest and from which sources they can be obtained. FIG. 5 also provides a mapping to where the sample workload data can be obtained. In FIG. 5, a number of strategies 104 and sub-strategies 105 map to various configuration and workload sources, collectively referred to by numeral 102. As discussed making reference to FIG. 4, the strategies 104 may relate to database consolidation, OS-level stacking, application server stacking and virtualization. Each strategy 104 includes a set of sub-strategies 105, which in turn map to specific rule sets 43. The rule sets, which will be explained in greater detail below, determine whether or not a particular setting or system criterion/criteria have been met and thus how different one server 28 is to the next.

Figure 7:
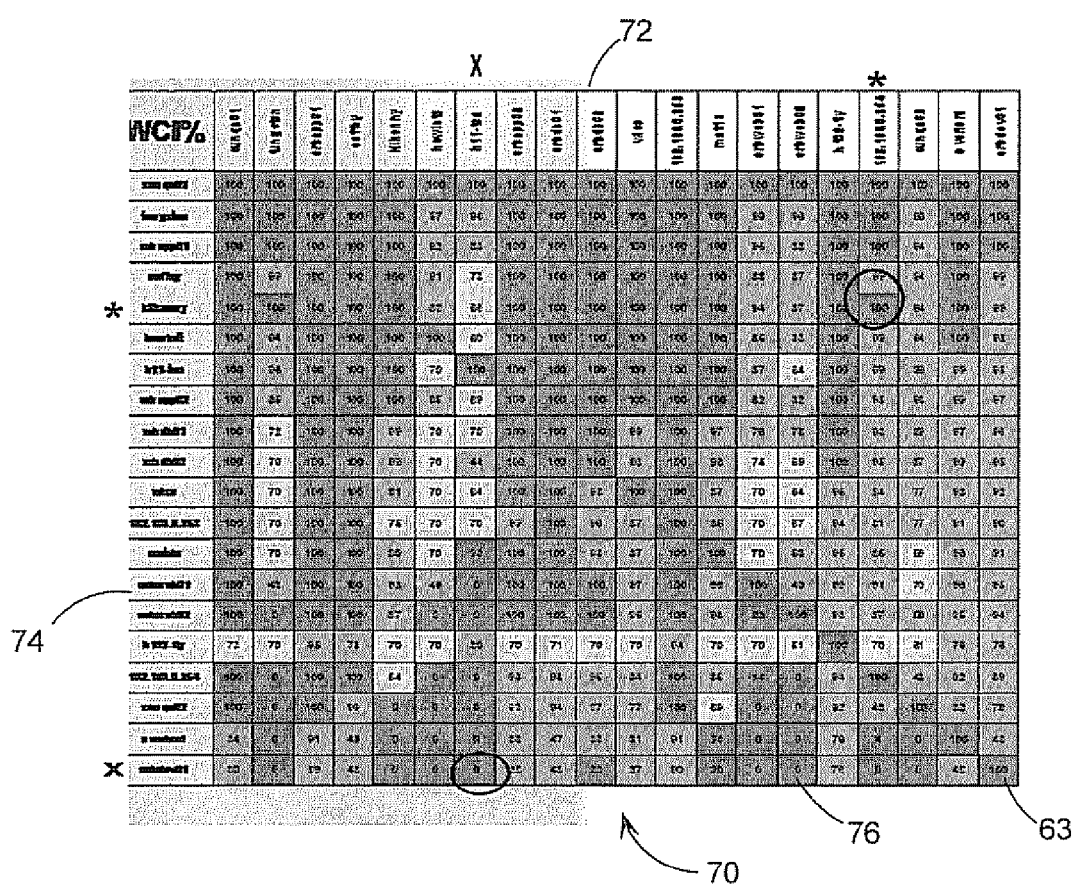

The table 100 lists the supported consolidation strategies and the relevant data sources that should be audited to perform the corresponding consolidation analysis. In general, collecting more basis data improves the analysis results. The table 100 enables the analysis program 10 to locate the settings and information of interest based on the strategy 104 or sub-strategy 105 (and in turn the rule set) that is to be used to evaluate the systems 28 in the environment 12. The results can be used to determine source/target candidates for analysing the environment for the purpose of, e.g. consolidation, compliance measures etc System Workload Compatibility Visualization An example WCI matrix 70 is shown in FIG. 7. The WCI matrix 70 is the analog of the SCI matrix 60 for workload analysis. The WCI matrix 70 includes a similar graphical display that indicates a score and a colour or shading for each cell to provide an intuitive mapping between candidate source/target server pairs. The workload data is obtained using tools such as the table 100 shown in FIG. 5 and corresponds to a particular workload factor, e.g. CPU utilization, network I/O, disk I/O, etc. A high workload score indicates that the candidate server pair being considered has a high compatibility for accommodating the workload on the target system. The specific algorithms used in determining the score are discussed in greater detail below. The servers are listed in the upper row 72 and leftmost column 74 and each cell 76 represents the compatibility of its corresponding server pair in the matrix. The encircled cell identified by the asterisk (*) in FIG. 7 indicates a high workload compatibility for consolidating to the target server, and the one marked by the X indicates an unlikely candidate pair for workload consolidation, compliance etc.

System Co-Habitation Compatibility Visualization

Figure 8:
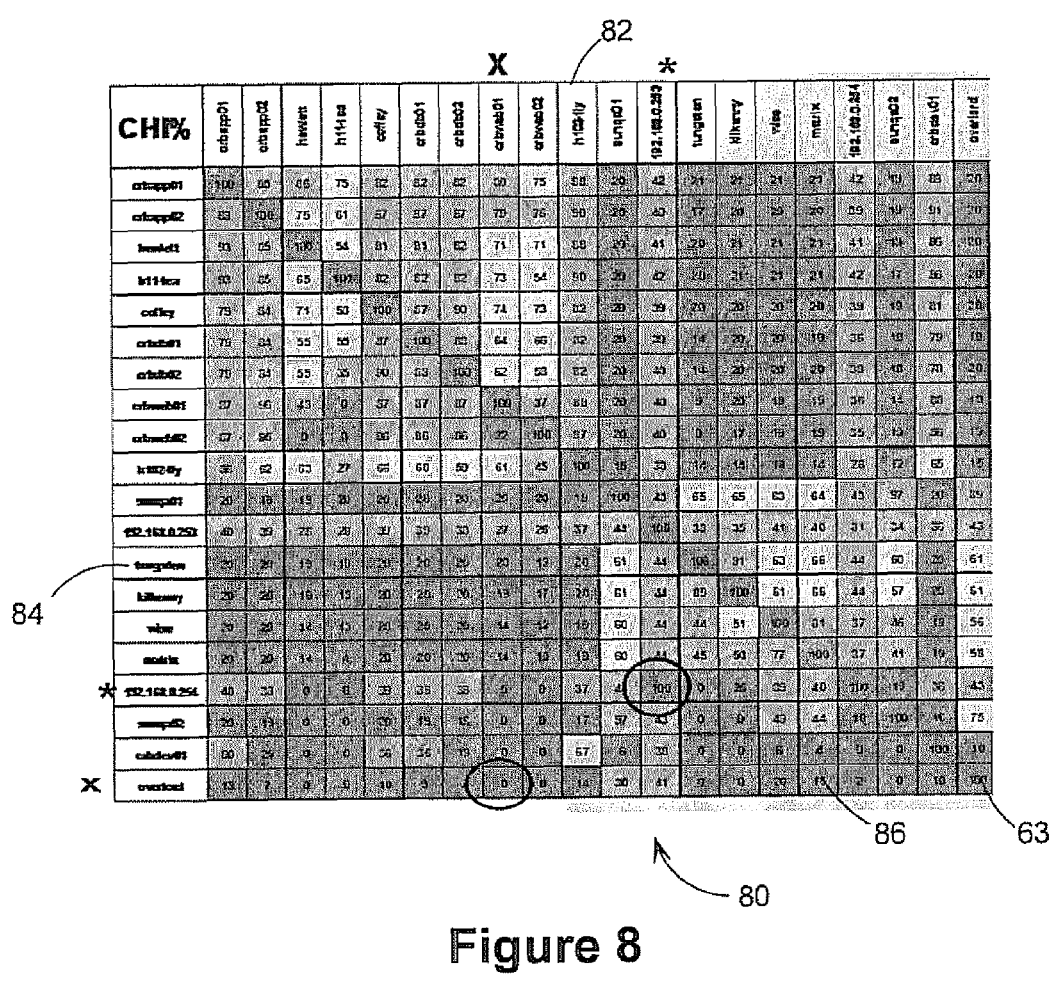

An example CHI matrix 80 is shown in FIG. 8. The CHI matrix 80 comprises a similar arrangement as the SCI and WCI matrices 60, 70, which lists the servers in the uppermost row 82 and leftmost column 84 to provide 100% compatibility along the diagonal. Preferably the same scoring and shading convention is used as shown in FIG. 8. The CHI matrix 80 provides a visual display of scoring for candidate system pairs that considers both the configuration compatibility from the SCI matrix 60 and the workload compatibility from the WCI matrix 70.

The score provided in each cell 86 indicates the co-habitation compatibility for consolidating servers. It should be noted that in some cases two servers 28 can have a high configuration compatibility but a low workload compatibility and thus end up with a reduced or relatively low co-habitation score. It is therefore seen that the CHI 80 provides a comprehensive score that considers not only the compatibility of systems 28 at the setting level but also in its utilization. By displaying the SCI matrix 60, WCI matrix 70 and CHI matrix 80 in the consolidation roadmap 90, a complete picture of the entire system can be ascertained in an organized manner. The matrices 60, 70 and 80 provide a visual representation of the compatibilities and provide an intuitive way to evaluate the likelihood that systems can be consolidated and have associated tools (as explained below) that can be used to analyse compliance and remediation measures to modify systems 28 so that they can become more compatible with other systems 28 in the environment 12. It can therefore be seen that a significant amount of quantitative data can be analysed in a convenient manner using the graphical matrices 60, 70, 80 and associated reports and graphs (described below).

For example, a server pair that is not compatible only for the reason that certain critical software upgrades have not been implemented, the information can be uncovered through analysis tools used with the SCI matrix 60, and then investigated, so that upgrades can be implemented, referred to herein as remediation. Remediation can be determined by modeling cost of implementing upgrades, fixes etc that are needed in the rule sets. If remediation is then implemented, a subsequent analysis may then show the same server pair to be highly compatible and thus suitable candidates for consolidation.

Sorting Examples

The matrices 60, 70 and 80 can be sorted in various ways to convey different information. For example, sorting algorithms such as a simple row sort, a simple column sort and a sorting by group can be used.

A simple row sort involves computing the total scores for each source system (by row), and subsequently sorting the rows by ascending total scores. In this arrangement, the highest total scores are indicative of source systems that are the best candidates to consolidate onto other systems.

A simple column sort involves computing the total scores for each target system (by column) and subsequently sorting the columns by ascending total score. In this arrangement, the highest total scores are indicative of the best consolidation target systems.

Sorting by group involves computing the difference between each system pair, and arranging the systems to minimize the total difference between each pair of adjacent systems in the matrix. The difference between a system pair can be computed by taking the square root of the sum of the squares of the difference of a pair's individual compatibility score against each other system in the analysis. In general, the smaller the total difference between two systems, the more similar the two systems with respect to their compatibility with the other systems. The group sort promotes the visualization of the logical breakdown of an environment by producing clusters of compatible systems 18 around the matrix diagonal. These clusters are indicative of compatible regions in the environment 12.

Consolidation Roadmap

Figure 9:
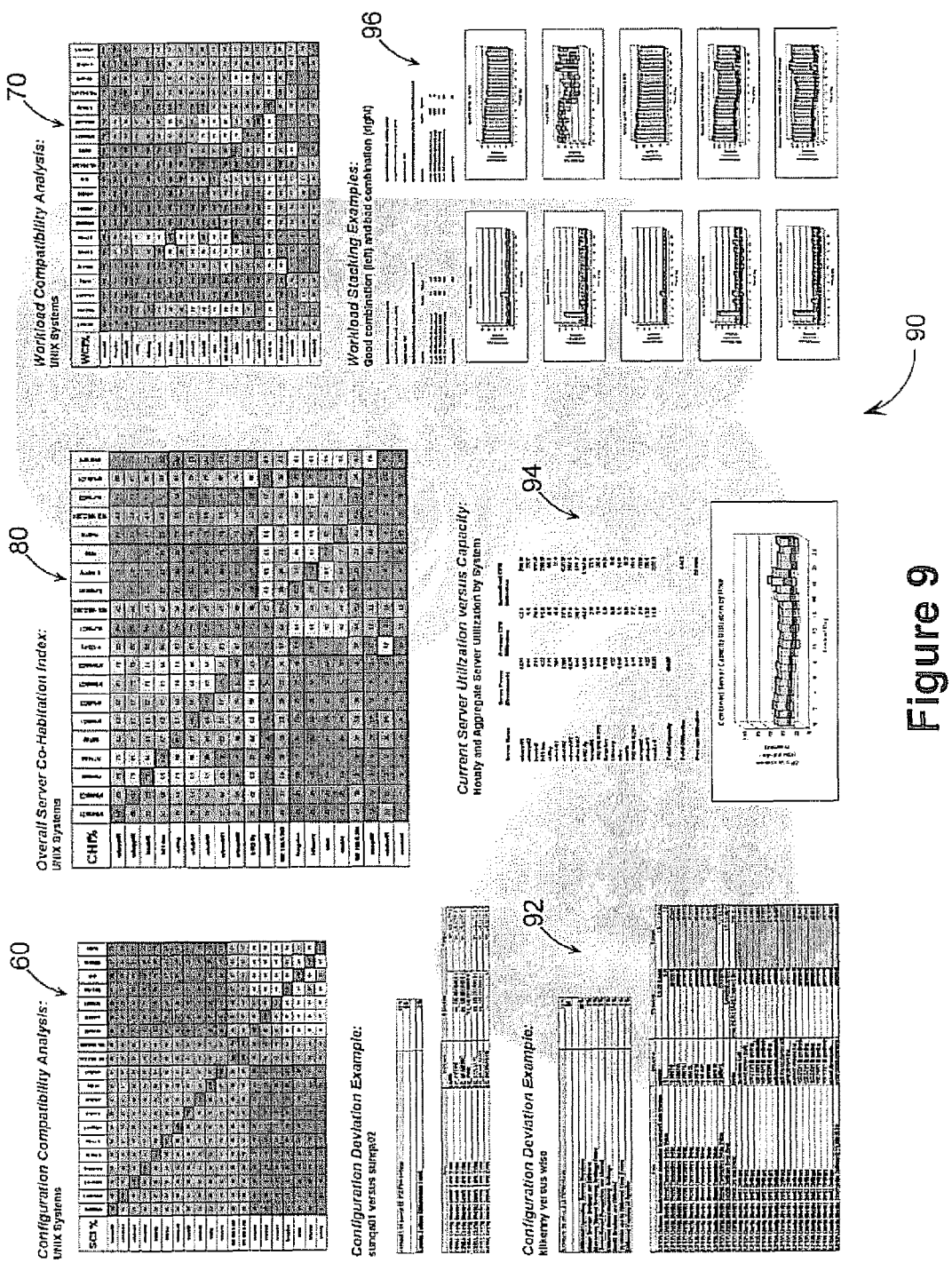
FIG. 9 is a graphical display showing server consolidation information.

The consolidation roadmap 90 shown in FIG. 9 illustrates how the matrices 60, 70 and 80 can be used to provide a complete visualization. As shown in FIG. 9, configuration deviation examples 92 can be generated based on the SCI matrix 60 and displayed in a chart or table to show where compatibilities are lacking. Similarly, workload stacking examples 94 can be generated based on the WCI 70 to show how a candidate server pair would operate when the respective workloads are stacked. Ultimately, a current server utilization versus capacity comparison 96 can also be illustrated to show combined server capacities and other information pulled from the CHI 80.

System Compatibility Analysis Overview

Figure 21:
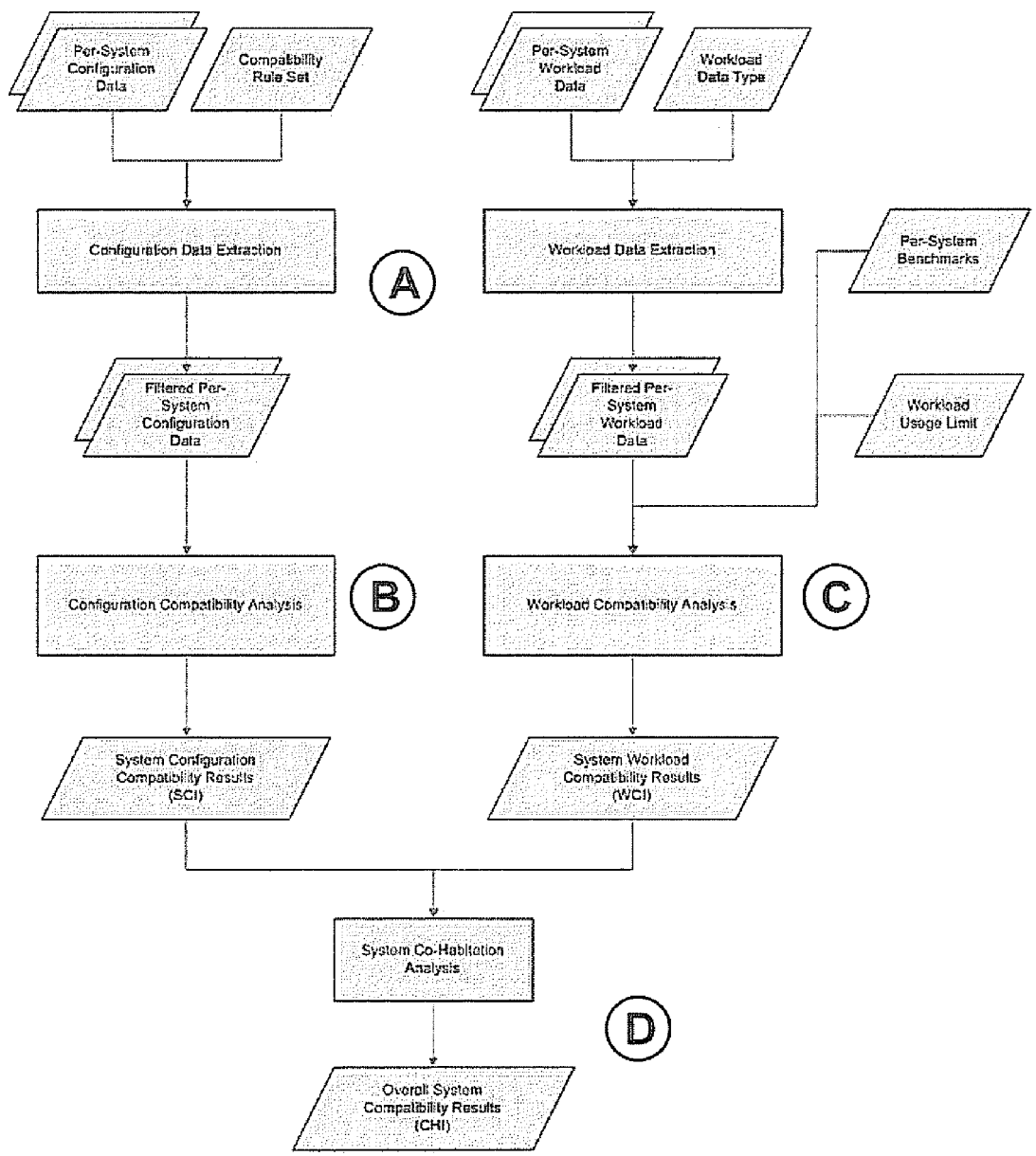
FIG. 21 is a flowchart illustrating a system compatibility analysis procedure.

The following illustrates an example for generating the matrices 60, 70 and 80 discussed above. The analysis program 10 generally executes four primary stages as shown in FIGS. 3 and 21.

System Configuration Compatibility

Figure 22:
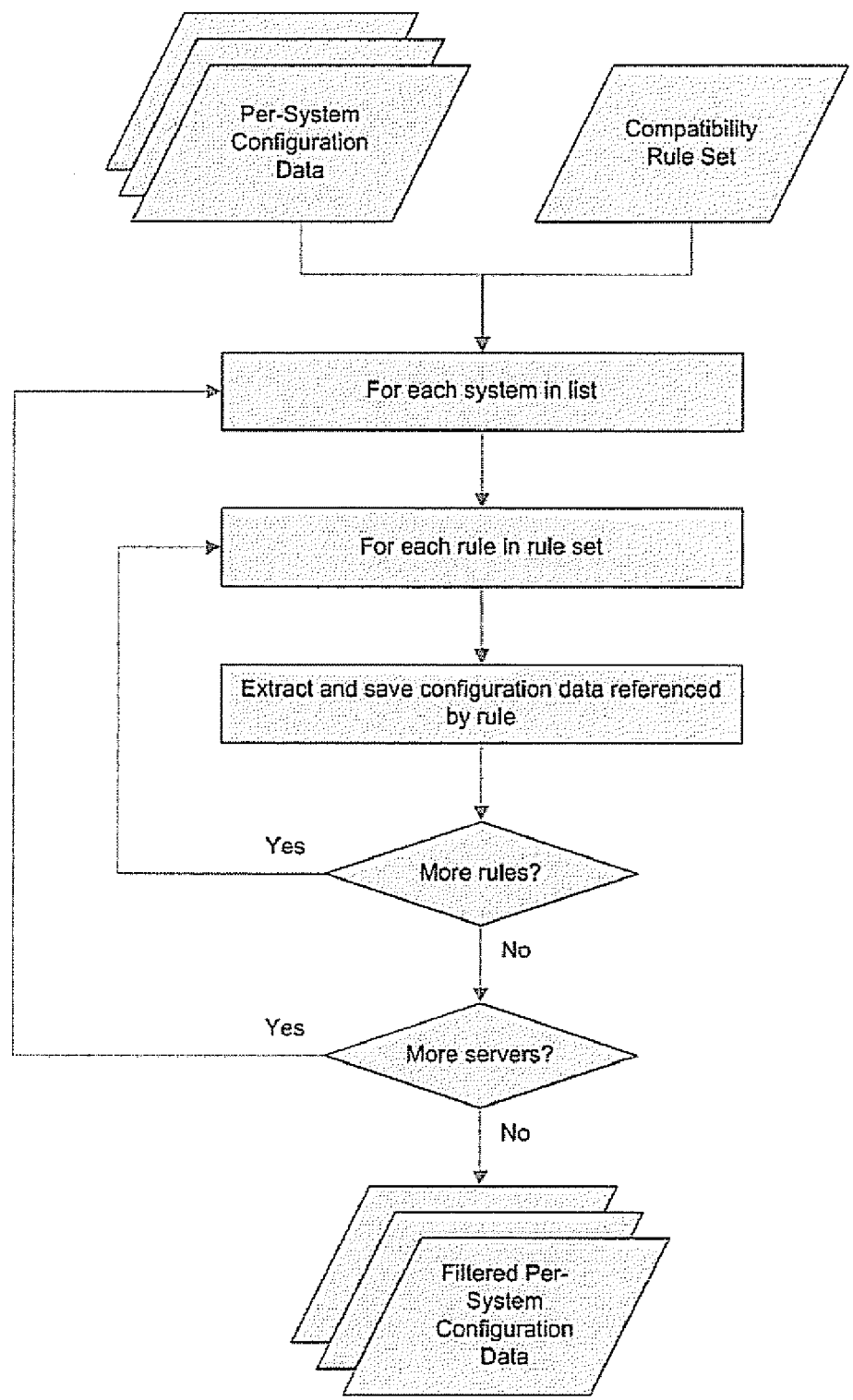
FIG. 22 is a flowchart illustrating a configuration data extraction procedure.

In stage A, a configuration data extraction step is performed, which is shown in greater detail in FIG. 22. The per-system configuration data comprises a data set for each system 28 that is obtained during the auditing process. The compatibility rule set defines which settings are important for determining compatibility. The compatibility rule set is typically a predefined set of rules which can be revised as necessary based on the specific environment 12. The rule set is thus preferably compiled according to the target systems being analysed and prior knowledge of what makes a system compatible with another system for a particular purpose.

Differential Rule Sets

Further detail regarding the rules and rule sets is now described making reference to FIGS. 29-32, as described in co-pending U.S. patent application Ser. No. 11/535,308, filed on Sep. 26, 2006, and entitled "Method for Evaluating Computer Systems", the contents of which are incorporated herein by reference.

With respect to the following description of the differential rule sets 74 and the general application of the rule sets 74 for evaluating differences between systems, the following alternative nomenclature may be used. A target system refers to a system being evaluated, and a baseline system is a system to which the target system is being compared. The baseline and target systems may be the same system at different instances in time (baseline=prior, target=now) or may be different systems being compared to each other. As such, a single system can be evaluated against itself to indicate changes with respect to a datum as well as how it compares to its peers. It will be appreciated that the terms "source system" and "baseline system" are herein generally synonymous, whereby a source system is a type of baseline system.

Figure 29:
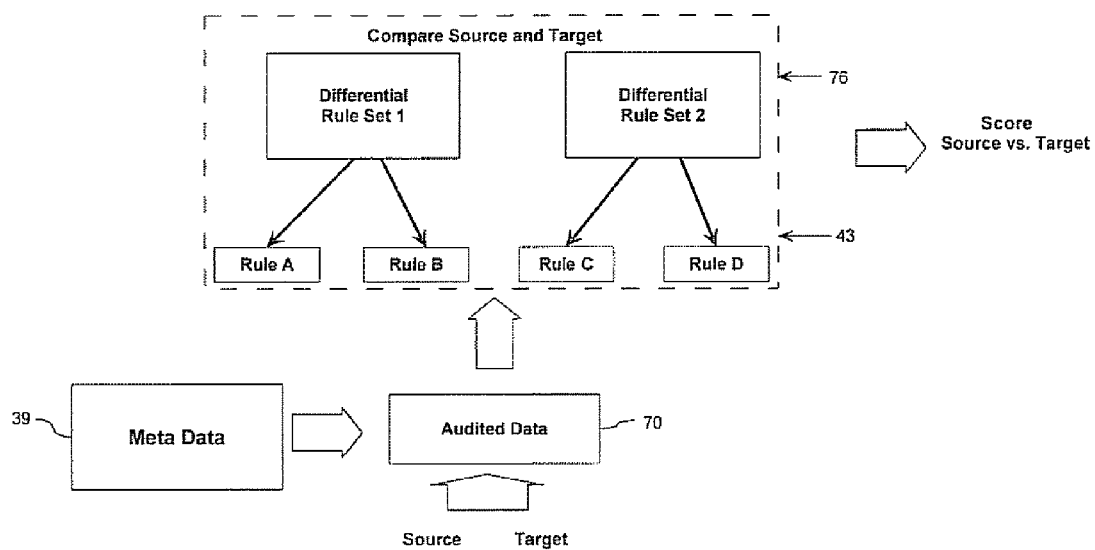
FIG. 29 is a hierarchical block diagram illustrating metadata, rules and rule sets.

FIG. 29 illustrates a visual representation of the relationships between data used by the analysis program 10. Audited data 70 is obtained from the source and target computer systems 28 and is used to evaluate the differences between the systems 28. In this example, the differences are evaluated to determine configuration compatibilities for a consolidation strategy. A distinct data set is preferably obtained for each system 28 (or instance in time for the same system 28 as required).

Metadata 39 describes the meaning of the audited data 70 as it pertains to the analysis. Preferably, comprehensive metadata 39 is included in the analysis program 10 and should be capable of being modified based on the specific application and the nature of the computer systems 28.

Differential rules 43 are conceptually a form of metadata 39 that represent the importance of differences in certain parameters for the baseline and target systems 28, the dependencies between different aspects of the audited data 70, and the costs associated with the remediation of differences between the system parameters.

Differential rule sets 76 are groupings of rules that represent higher-level considerations such as business objectives or administrative concerns that are taken into account when reporting on or analysing the systems 28. In this example, four differential rules 43, A, B, C and D, are grouped into two differential rule sets 76, Rule Set 1 and Rule Set 2. It will be appreciated that there may be any number of rules 43 in any number of differential rule sets 76 and those shown in FIG. 2 are for illustrative purposes only.

The differential rules 43 evaluate the differences in parameters in the audited data 70 according to rule definitions. The rule definitions include weights that are indicative of the importance of the differences in particular parameters as they relate to the operation of the systems 28. The weights are applied during an evaluation of the baseline and target systems 28 if the difference exists. The evaluation may include the computation of a score or generation of other information indicative of the nature of the difference(s) between the baseline and target systems 28.

Figure 30:
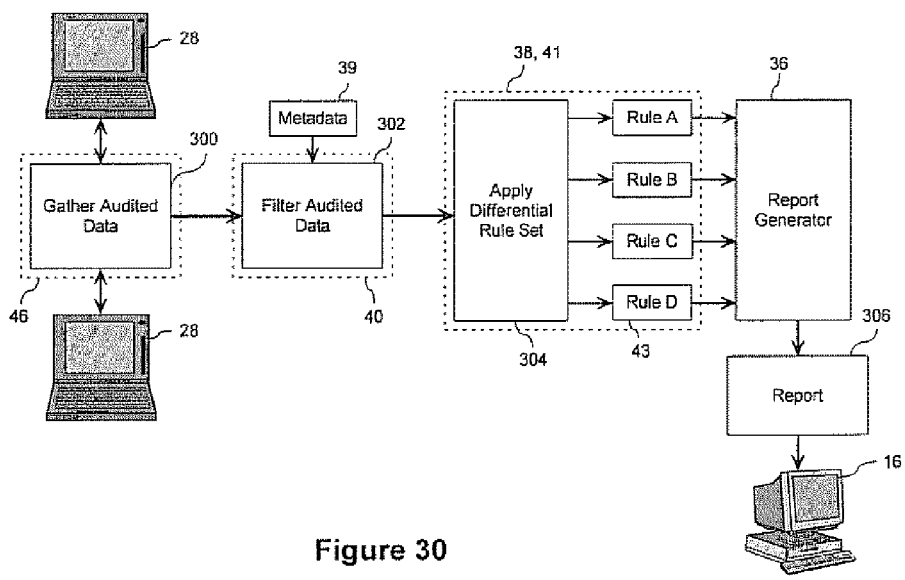
FIG. 30 is a schematic flow diagram showing the application of a mile set in analyzing a pair of computer systems.

The flow of data for applying an exemplary rule set 76 is shown in FIG. 30. In the example shown in FIG. 30, the audit engine 46 gathers audited data at step 300 from a pair of laptop computer systems 28. At step 302, the context engine 40 filters the audited data 70 using metadata 39 to determine which parameters of the laptop computer systems 28 are applicable to the analysis. The differential engine 38 and the analysis engine 41 took at the differences in parameters for the systems 28 and apply a differential rule set at step 304 which in turn evaluates the differential rule definitions for exemplary rules A, B, C and D.

As noted above, the rules 43 evaluate the differences in the baseline and target systems 28 and apply weights that indicate the importance of such differences in the parameters that have been analysed as well as the dependencies between different aspects of the data. The rule sets 76, e.g., Rule Set 1 and Rule Set 2, determine which parameters in the audited data 70 are to be evaluated and the differential rules 43 in the differential rule sets 76 are applied to the differences between the parameters in the baseline and target systems 28 based on the presence of a difference. The difference may simply be whether or not the parameter is different but nature of the difference may also be considered and have weights that vary based on how different the parameter is. As such, the differential rules 43 and corresponding weights may vary accordingly. For example a version 4 operating system versus a version 3 operating system may be considered less costly to remedy and thus less detrimental than a version 5 operating system compared to a version 1 operating system. As can be seen, even though the operating systems are different in both cases, the nature of the difference can also be considered and different weights and/or remedies applied accordingly.

The report generator 36 uses the results of the application of the differential rules 43 to generate a report at step 306, which is then in turn displayed on the computing station 16 for subsequent analysis, use and/or storage.

A general definition for a differential rule 43 is shown in FIG. 31. Each rule definition comprises a number rule fields and the corresponding values. A rule definition can be extended to include any number of rules 43 to form a rule set 76 as shown by way of example only in FIG. 92. The rule definitions are computer readable and storable so that they may be accessed by the program 10 and modified if necessary, for use in evaluating the computer systems 28.

The rule type specifies whether the rule 43 applies to audited data directly (UrlQuery) or normalized values (AliasQuery). The rule specifier specifies the URL of the data object or property that is being evaluated. The optional URL fragment (i.e. the portion after the "#" symbol) specifies the specific object instance (table row) that is being evaluated, with "*" denoting a wildcard that matches all instances. For AliasQuery rules, this field specifies the alias name.

If specified, the source field represents the literal value that would need to match the value of the object/property on the source system in order for the rule 43 to match. For objects and object instances, the keywords "absent" and "present" are preferably used to match cases where that object is absent or present respectively. Similar to the source field, the target field allows a literal match against the value of the object/property on the tar-et system. The target field also supports the absent/present specifiers. For numeric properties, relational operators (>, <, =, !=) can be used to cause the rule 43 to trigger if the target value has the specified relationship with the source value.

The weight field specifies the relative importance of that property and combination of source/target values (if specified) in regard to the overall context of the comparison. Higher values indicate that the condition detected by the rule 43 has a high impact on the target environment.

The mutex flag field can be used to avoid multiple penalties that would otherwise skew the scores. A "Y" in the mutex flag field specifies that multiple matches of the same rule 43 will incur only a single penalty on the overall score (as specified in the weight field), as opposed to multiple accumulating penalties (which is the default behaviour).

The match flag field enables an optional symbolic flag to be "set" when a rule 43 matches, and which can subsequently be used to suppress other rules 43 (through the "Suppress Flags" field). This effectively allows rule dependencies to be modeled in the rule set 76. The suppress flag field allows symbolic flags (as specified in the "Match Flag" field) to be used to suppress the processing of rules. This allows specific checks to be skipped if certain higher-level conditions exist. For example, if the operating systems are different, there is no need to check the patches.

The remediation cost field is preferably optional. The remediation field represents the cost of "fixing" the system(s) (i.e. eliminating the condition or discrepancy detected by the rule 43). When analyzing differences between (or changes to) IT systems this is used to represent hardware/software upgrade costs, administrative costs and other costs associated with making the required changes to the target systems. The calculations behind this field vary based on the nature of the system and the parameter that would need to be added, upgraded etc.

The description field is a lay description of the condition or discrepancy detected by the rule 43. These descriptions are used to provide management-level summaries when processing rule sets 76. The description field can provide as much or as little information as required by the application.

FIG. 32 provides an example rule set 76, which includes a number of rules 43. The following refers to the number indicated in the leftmost column of FIG. 37.

Rule 1 scrutinizes the normalized (AliasQuery) representation of the operating systems (e.g. Windows™, Solaris™, AIX™, Linux™, etc.) on both the source and target systems and heavily penalizes cases where these are different as evident from the high weight factor (70%). Rule 2 penalizes systems that have different operating system versions (e.g. Windows™ NT vs Windows™ 2000), and is suppressed (i.e. not processed) in cases where the systems have different overall operating systems (as detected in the previous rule 43). Rule 3 detects if systems are in different time zones. Rule 4 penalizes combinations of systems where the target has less memory than the source (this is what is referred to as a directional rule 43, which can give differing results if sources and targets are reversed, e.g. asymmetric results). Rule 5 operates directly against audit data and detects cases where the operating system patch level differs. This rule is not processed if either the operating system or the operating system version are different (since this renders the comparison of patches meaningless).

Rule 6 scrutinizes the lists of all patches applied to the source and target systems and penalizes cases where they differ. The mutex flag is set, indicating that the penalty is applied only once, no matter how many patch differences exist. This rule is ignored in cases where either the operating system or operating system version are different. Rule 7 penalizes system combinations of servers that are running the same OS but are configured to run a different number of kernel bits (e.g. 64-bit vs 32-bit). Rule 8 penalizes combinations where there are kernel parameters defined on the source that are not defined on the target. This rule is not applied if the operating systems are different.

Rule 9 scrutinizes a specific kernel setting (SHMMAX, the setting that specifies how much shared memory a system can have) and penalizes combinations where it is set to a lower value on the target than it is on the source system. Rule 10 penalizes combinations of systems that are running different versions of Oracle™. It should be noted that the remediation cost is relatively high, owing to the fact that it will take a software upgrade to eliminate this discrepancy. Rule 11 penalizes combinations of systems that are running different database version, e.g. Oracle™ 9 vs. Oracle™ 8. In some cases the remediation cost can be low where the upgrade is less expensive. Rule 12 penalizes combinations of systems that are running different versions of Apache. It should be noted that the remediation cost is relatively low, as apache is an open source product and the cost of upgrade is based on the hourly cost of a system administrator and how long it will take to perform the upgrade.

Rule 13 scrutinizes a windows-specific area of the audit data to determine if the source and target systems are running different service pack levels. It should be noted that this rule closely mirrors rule 5, which uses a rule specifier that scrutinizes the UNIX™/Linux™ area of the audit data. Rule 14 scrutinizes the lists of all hotfixes applied to the source and target systems and penalizes cases where they differ. This rule closely mirrors rule 6, which scrutinizes patches on UNIX™ and Linux™. Rule 15 detects differing startup commands between systems. Rule 16 is a rule 43 to detect differing Paths between systems, and rule 17 detects differing System Paths between systems.

Rule 18 penalizes system combinations where there are services installed on the source that are not installed on the target. This rule has the mutex flag set, and will therefore only penalize a system combination once, no matter how many services are missing. Rule 19 penalizes system combinations where there are services started on the source that are not started on the target. It should be noted that both the weight and the remediation cost are lower than the previous rule 43, owing to the fact that it is generally easier and less expensive to start a service than install it. Finally, rule 20 penalizes combinations where the target system is missing the virus scanner software.

It will be appreciated that the above described rules 43 and rule set 76 are shown for illustrative purposes only and that any combination of rules 43 can be used to achieve specific goals. For example, rules that are applicable to the OS can be grouped together to evaluate how a system 28 compares to its peers. Similarly, rules pertaining to database, Java applications etc. can also be grouped.

System Configuration Compatibility Continued . . .

Turning back to FIG. 22, configuration data extraction analyses the per-system configuration data and the compatibility rule sets. Each system is analysed for each rule in the rule set. For each rule, the configuration data referenced by the rule (according to its definition) is extracted and saved by the analysis engine 41. The extraction process results in a filtered data set for each system 28 that corresponds to the actual configuration data that can be used to determine compatibilities between the systems 28. The filtered data is used in Stage B for the compatibility analysis.

Figure 23:
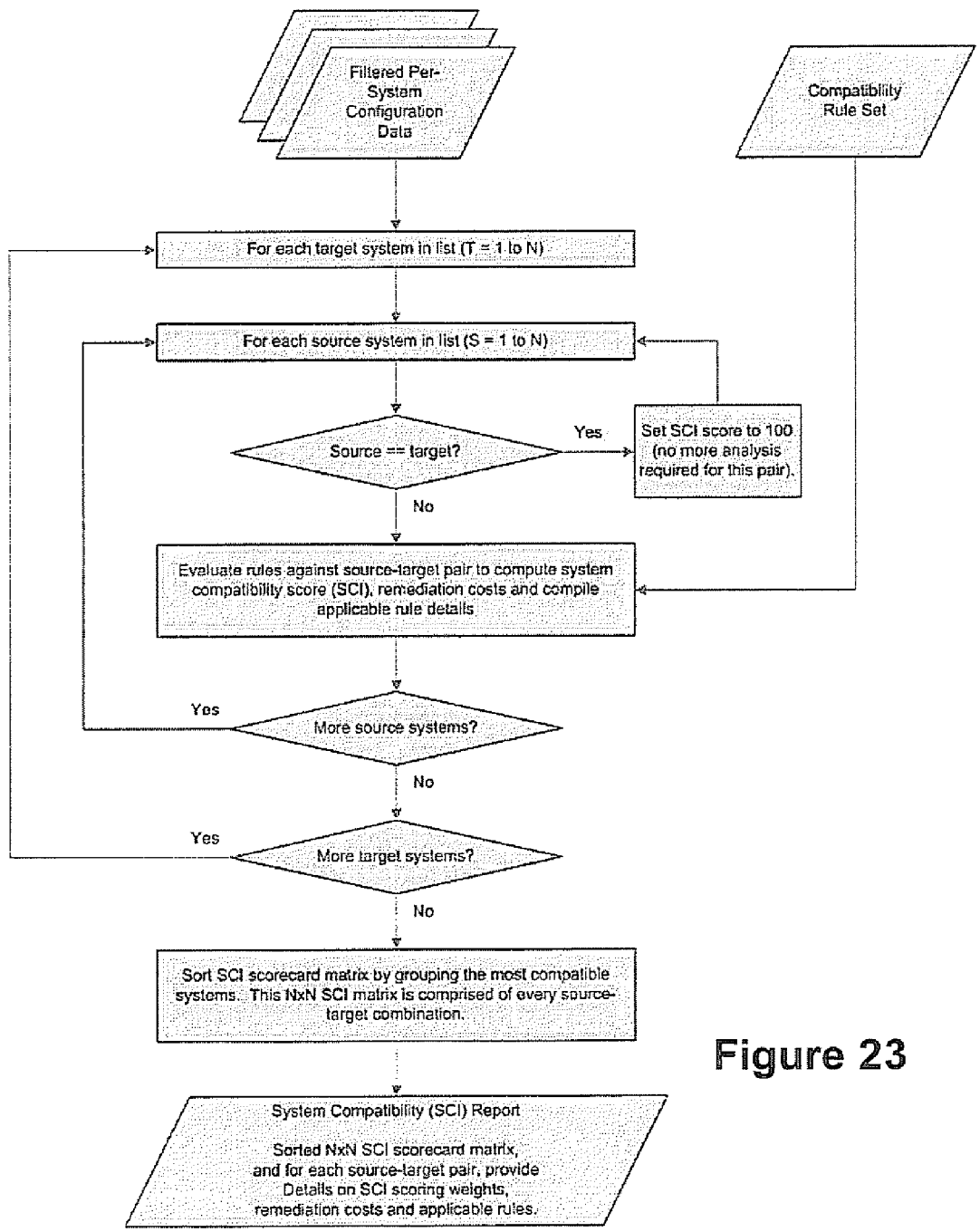
FIG. 23 is a flowchart illustrating a configuration compatibility analysis procedure.
Figure 24:
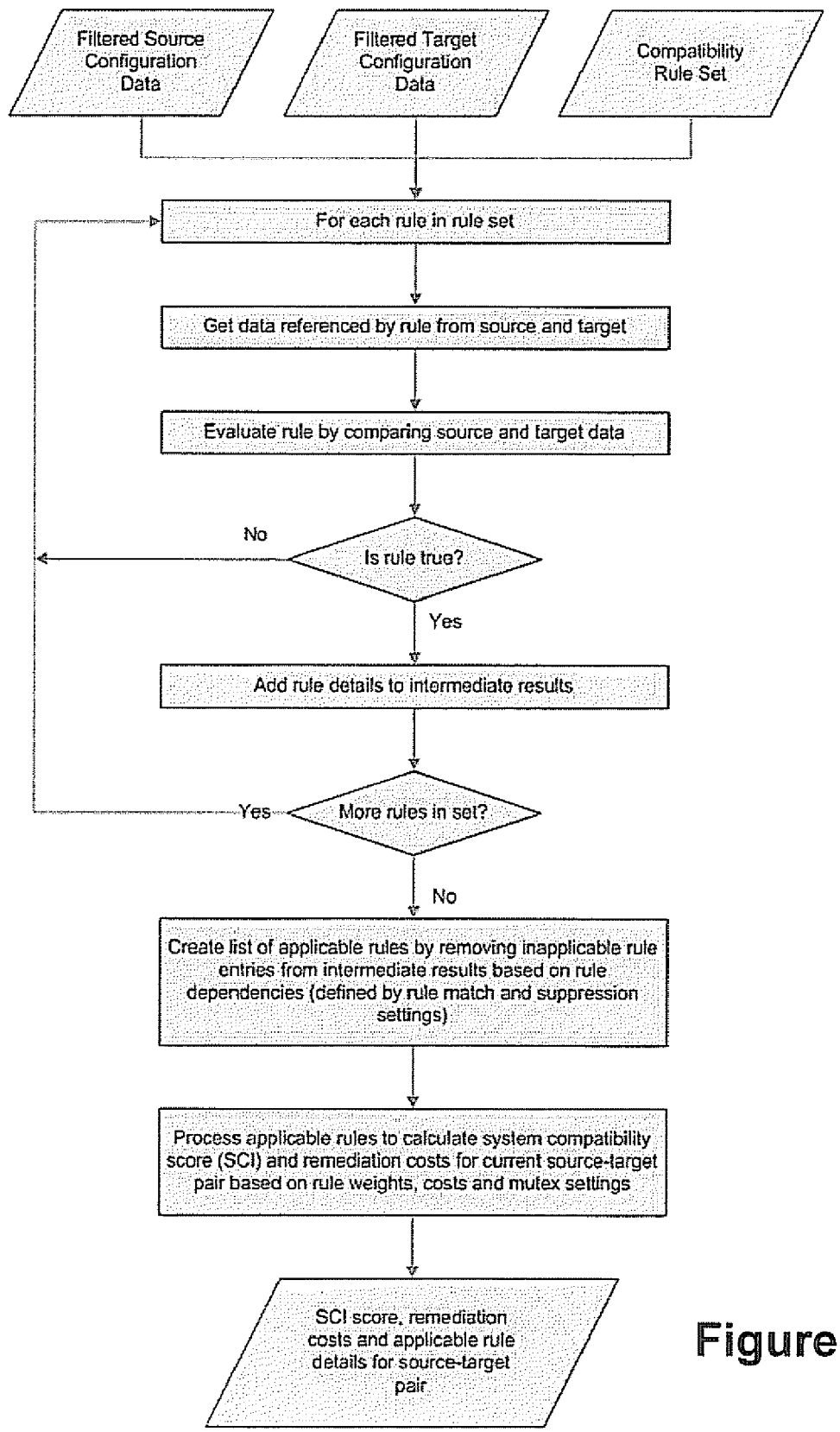
FIG. 24 is a flowchart illustrating a rule set application procedure.

An exemplary flow chart for a configuration compatibility analysis is shown in greater detail in FIGS. 23-24. When analyzing system compatibility, the list of target and source systems 28 are the same. The compatibility is evaluated in two directions, e.g. for a Server A and a Server B, migrating A to B is considered as well as migrating B to A.

Turning first to FIG. 23, for each target system T (T=1 to N where N is the number of systems), the differential engine 38 first looks at each source system S (S=1 to N). If the source-target then the SCI score for that source is set to 100, no further analysis is required and the next pair is analyzed. If the source and target are different, the rules are evaluated against the source/target pair to compute the SCI score, remediation cost and to compile the associated rule details. Estimated remediation costs are optionally specified with each rule item. As part of the rule evaluation and subsequent SCI score calculation, if a rule is true (a difference is identified), the corresponding cost to address the deficiency is added to the remediation cost for the pair of systems 28 being analysed.

The evaluation of the rules is shown in FIG. 24. The evaluation of the rules considers the filtered configuration data for both the source system and the target system, as well as the compatibility rule set that is being applied. For each rule in the set, the data referenced by the rule is obtained from both the tar-et data and source data. The rule is evaluated by having the differential engine 38 compare the data. If the rule is not true (i.e. if the systems are the same according to the rule definition) then the data is not considered in the SCI score and the next rule is evaluated. If the rule is true, the rule details are added to an intermediate result. The intermediate result includes all true rules.

Preferably, a suppression tag is included with each rule. As discussed above, the suppression tag indicates other rules that are not relevant if that rule is true. The suppression flag allows the program 10 to avoid unnecessary computations, A mutex flag is also preferably used to avoid unfairly reducing the score for each true rule when the rules are closely affected by each other.

Once each rule has been evaluated, a list of applicable rules is created by removing inapplicable rule entries from the intermediate results based on rule dependencies, which are defined by rule matching and suppression settings (e.g. mutex flags and suppression tags). The applicable rules are then processed to calculate the SCI score for that particular source/target pair based on the rule weights. Remediation costs are also calculated based on the cost of updating/upgrading etc. and the mutex settings.

Turning back to FIG. 23, the current target is then evaluated against all remaining sources and then the next target is evaluated. As a result, a N×N matrix can be created that shows a compatibility score for each system against each other system. The matrix can be sorted by grouping the most compatible systems. The sorted SCI matrix 60 is comprised of every source/target combination and thus provides an organized view of the compatibilities of the systems 28.

Preferably, an SCI report is then generated comprising the SCI matrix 60 (e.g. FIG. 6) and for each source-target pair details available pertaining to the SCI scoring weights, remediation costs and applicable rules. The details can preferably be pulled for each source/target pair by selecting the appropriate cell.

System Workload Compatibility

Figure 25:
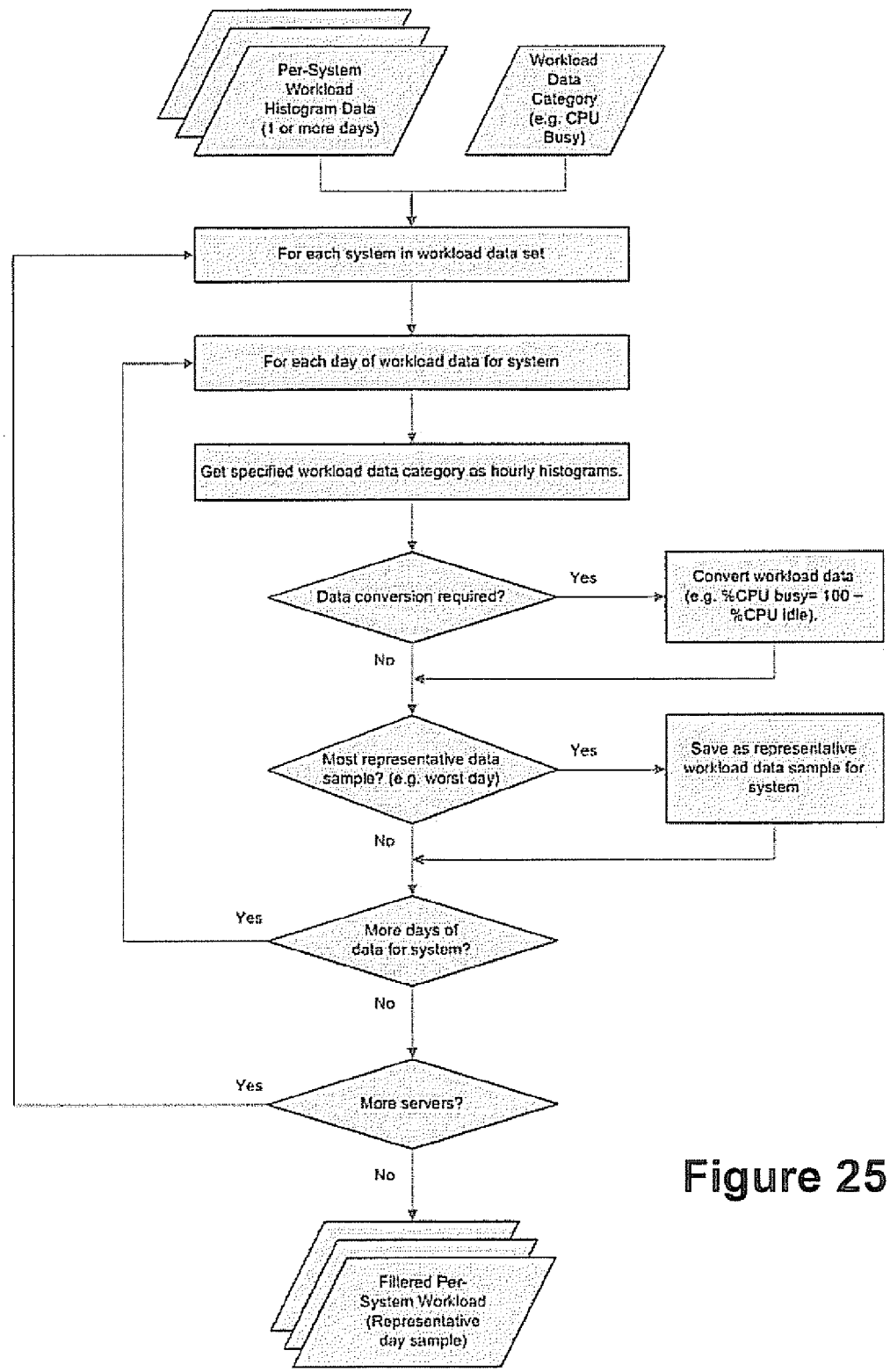
FIG. 25 is a flowchart illustrating a workload data extraction procedure.

Turning back to FIG. 21, in stage A, a workload data extraction step is shown. The workload data extraction is shown in greater detail in FIG. 25. The data extraction considers the per-system workload histogram data obtained during the auditing process and workload data category, e.g. CPU utilization). Preferably, the histogram data includes data obtained during one or more days. For each system in the workload data set, each day of the workload data for that system is analyzed. The analysis engine 41 evaluates the workload data at each hour according to the workload data category. Preferably, the analysis engine 41 also converts the data if required to accommodate inverted percentages. For example, if the data indicates that the CPU is idle for a certain percentage of the day, it is converted to the percentage of the day in which it is busy. This is done since in this example, the percentage that the system is busy is more relevant to how the CPU is being utilized rather than how much it is not being utilized.

In the current day beings evaluated, the analysis engine 41 determines if that sample of data is the most representative data, e.g. if it is the worst day. If the sample is the most representative, then it is saved as the current workload data sample for the system. If not and/or once the sample is saved, the analysis engine 41 then determines if there are any more days to evaluate. If not, the current representative day is deemed to be the most representative for that system 28 and the remaining systems 28 are evaluated if necessary. In the result, a filtered per-system workload data set is produced for each system, i.e. the representative sample for each system.

The filtered workload data is then used in Stage C for conducting the workload compatibility analysis. When analyzing workload compatibility, the list of target and source systems 28 are the same. The compatibility is evaluated in two directions, e.g. for a Server A and a Server B, migrating A to B is considered as well as migrating B to A.

Figure 26:
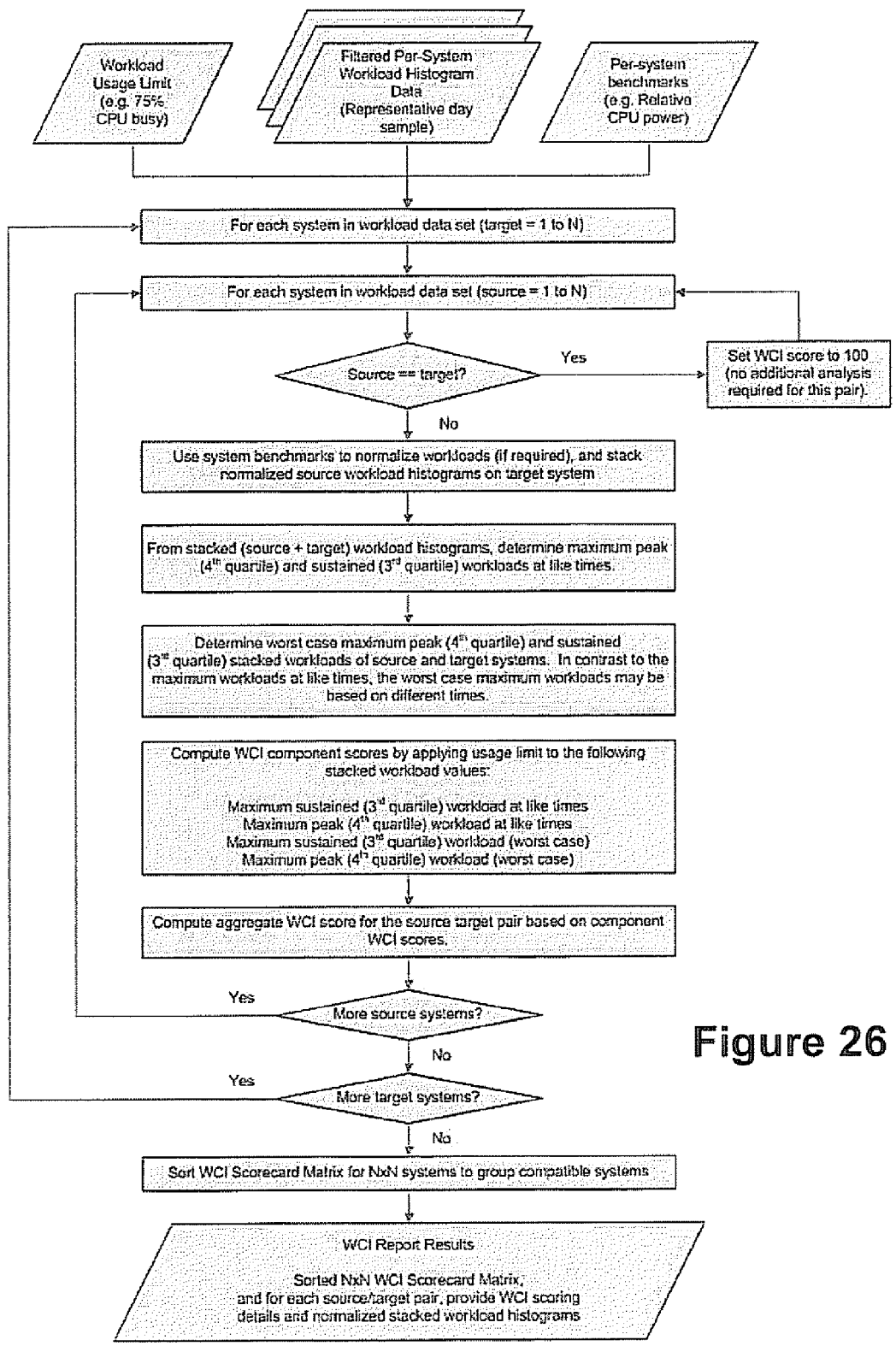
FIG. 26 is a flowchart illustrating a workload compatibility analysis procedure.

An exemplary workload compatibility analysis procedure is shown in FIG. 26 that uses the workload data obtained in stage A as discussed above, and also considers the workload limit usage, e.g. 75% of the CPU being busy, and the per-system benchmarks, e.g. relative CPU power. Each system 28 in the workload data set is considered as a target (T=1 to N) and compared to each other system 28 in the data set as the source (S=1 to N). The analysis engine 41 first determines if the source and target are the same. If yes, then the WCI score is set to 100 and no additional analysis is required for that pair. If the source and target are different, the system benchmarks are then used to normalize the workloads (if required). The normalized source workload histogram is then stacked on the normalized target system.

System benchmarks can normalize workloads as follows. For systems A and B, with CPU benchmarks of 200 and 400 respectively (i.e. B is 2× more powerful than A), if systems A and B have CPU utilization of 10% and 15% respectively, the workloads can be normalized 13 through the benchmarks as follows. To normalize A's workload to B, multiply A's workload by the benchmark ratio A/B, i.e. 10%×200/400=5%. Stacking A onto B would then yield a total workload of 5%+15%=20%. Conversely, stacking B onto A would yield the following total workload: 10%+15%×400/200=40%.

Using, the stacked histogram, the maximum peak ($4^{th}$ quartile) and sustained ($3^{rd}$ quartile) workloads at like times are determined. The worst case maximum peak ($4^{th}$ quartile) and sustained ($3^{rd}$ quartile) stacked workloads are then determined for the stacked workloads of the source/target pair. Typically, in contrast to the maximum workloads at like times, the worst case maximum workloads may be based on different times. The WCI score is then computed by applying the usage limit to the following stacked workload values: maximum sustained ($3^{rd}$ quartile) workload at like times, maximum peak ($4^{th}$ quartile) workload at like times, maximum sustained ($3^{rd}$ quartile) workload (worst case), and maximum peak ($4^{th}$ quartile) workload (worst case). The aggregate WCI score is then computed for the source/target pair based on the component WCI scores. To calculate the aggregate score, a weighting factor is applied to each component based on its relative importance to workload compatibility.

Each source is evaluated against the target, and each target is evaluated to produce an N×N matrix of scores, which can be sorted to group compatible systems. Preferably, a WCI report is generated that includes the WCI matrix 70 and WCI scoring details and normalized stacked workload histograms that can be viewed by selecting the appropriate cell. The workload compatibility results are then used for the CHI analysis.

System Co-Habitation Compatibility

Stage D uses the results of both the configuration and workload analyses to perform an overall co-habitation analysis. The co-habitation analysis is performed for each server pair found in the WCI 70. The corresponding configuration score is first located from the SCI 60 and a co-habitation score for the server pair is computed by applying a formula specified by an overlay algorithm which performs a mathematical operation such as multiply or average, and the score is recorded. If more servers are to be examined, the above process is repeated. When CHI scores for all server pairs have been computed, the CHI matrix 80 is displayed graphically (see FIG. 8) and each cell 86 is linked to a scorecard that provides further information. The further information can be viewed by selecting the cell. A sorting algorithm is then preferably executed to configure the matrix as shown in FIG. 8.

Once the above computations are complete, the complete roadmap 90 can be generated by displaying not only the CHI matrix 80, but also the SCI matrix 60 and the WCI matrix 70 and selected information from the associated scorecards as shown in FIG. 9.

System Workload Multi-Stacking

Figure 27:
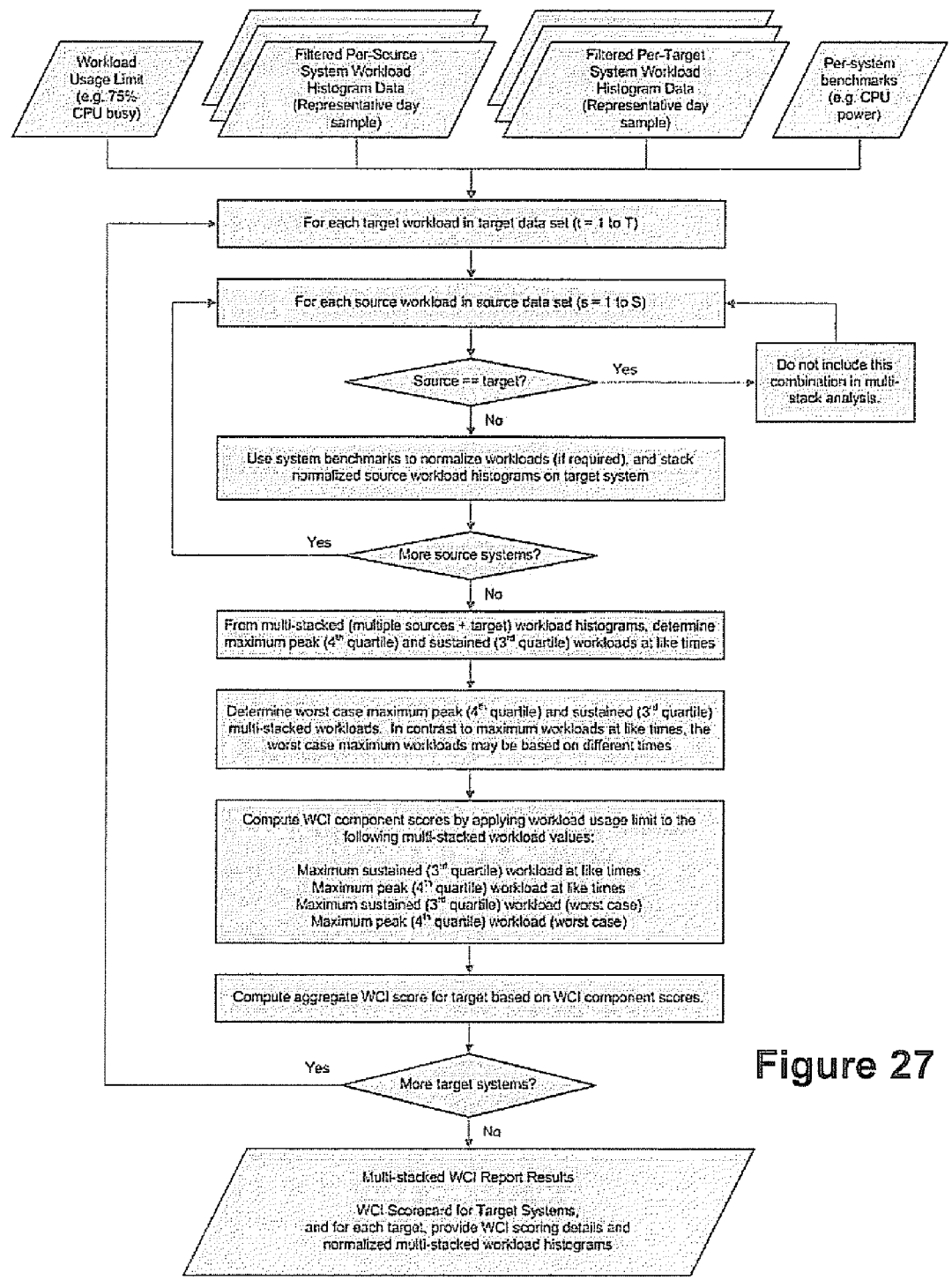
FIG. 27 is a flowchart illustrating a workload multi-stacking procedure.

A procedure for multi-stacking source systems on a target system is shown in FIG. 27. The multi-stacking procedure considers the workload usage limit that is specified using the program 150, the per-system benchmarks (e.g. CPU power), and the filtered workload data for the source and target systems. The multi-stack may include any number of sources stacked on a target. For each target workload data set, each source data set is evaluated. If the source and target are not the same, the system benchmarks are used to normalize the workloads as discussed above, and the source workload histogram is stacked on the target system. Each source in the set is then stacked on the target system. From the multi-stacked workload histogram (i.e. multiple sources on a target), the WCI component scores are computed similar to that discussed above, and an aggregate score for the multi-stack is computed to determine if such a multi-stack of systems can be supported by the target. The above is repeated for each target to determine which (if any) multi-stack arrangements are feasible. A multi-stack report may then be generated, which gives a WCI scorecard for the target systems and for each target, provides WCI scoring details and normalized multi-stacked workload histograms.

Figure 28:
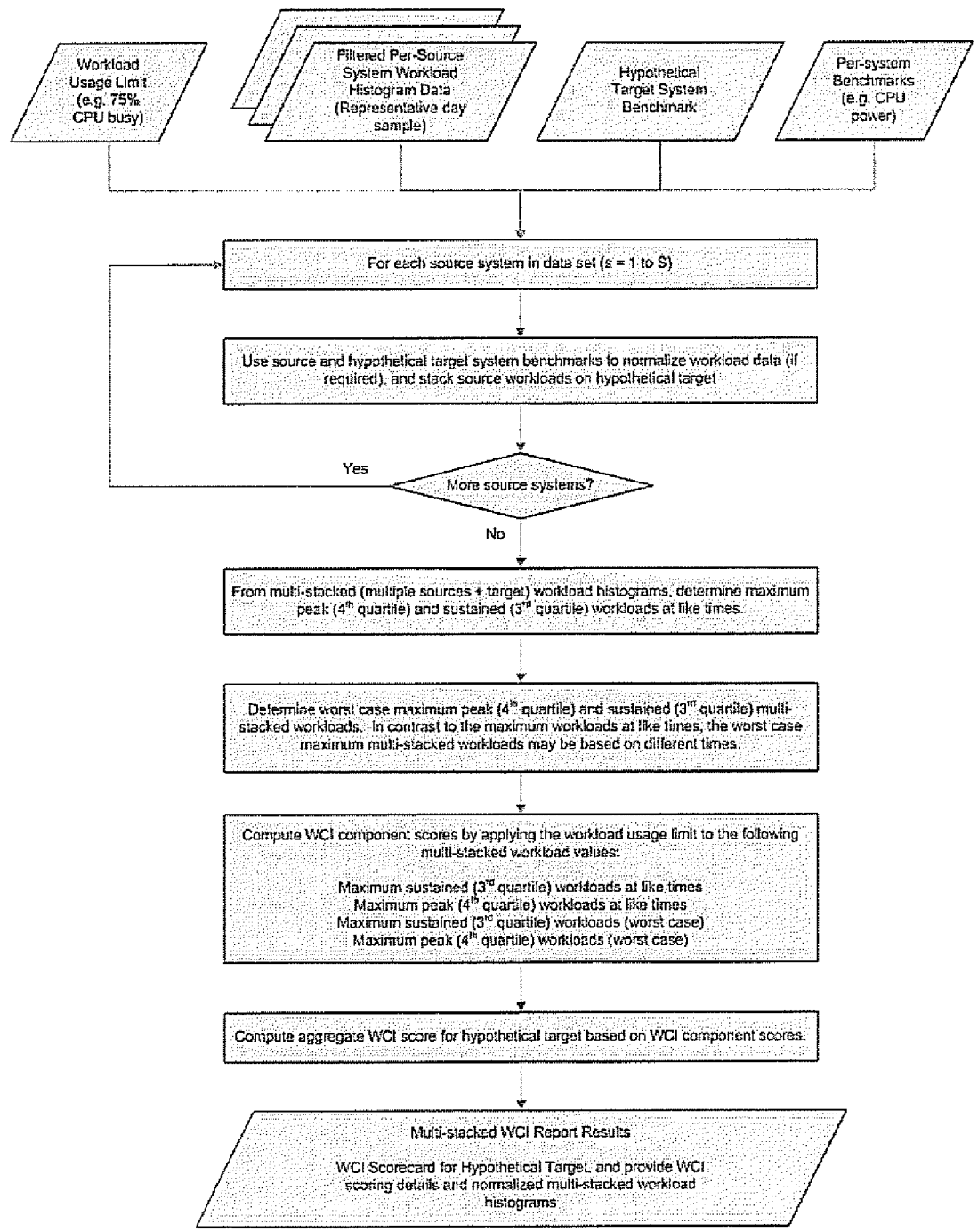
FIG. 28 is a flowchart illustrating another workload multi-stacking procedure using a hypothetical target system.

FIG. 28 shows a similar procedure to that shown in FIG. 27 but for multi-stacking multiple sources on a hypothetical target. As can be seen from FIG. 28, a hypothetical target system benchmark is considered as well as per-system benchmarks for the sources. It can also be seen that the procedure shown in FIG. 28 is used to show how multiple sources can be stacked on a hypothetical system. The hypothetical system is a "clean" system that can be used to simulate the case where a new target system is acquired to consolidate existing systems thereon.

System Consolidation Analysis Example

An example server consolidation analysis is provided below for an arbitrary environment 12 having four servers, namely server A, server B, server C and server D.

The audit engine 46 collects detailed configuration and workload information from the candidate servers 28, which may include, e.g. UNIX, Linux, Windows, AS/400 etc. The process of collecting the detailed information is herein referred to as an audit. The audit engine 46 collects the data from instrumented candidate systems 12 through various protocols such as simple network management protocol (SNMP), Windows management instrumentation (WMI), SSH etc. as shown in FIG. 1. Depending on the protocol used and the data to be collected, instrumentation 54 on the environment 12 may need to be augmented with additional software such as an agent associated with the analysis program 10.

The web client 34 and web interface allows the user to define the servers 28 to be audited, the actual data to be collected and the audit communication protocol. An example screen shot of an audit request program 110 is shown in FIG. 10.

The program 110 enables a user to name and describe the audit so that it can be later identified by entering the requisite information into the entry boxes 112. The audit request information is included in sub-window 114 and the target server information is included in sub-window 122. The type of request, e.g. SNMP is selected using the drop-down box 116. Based on this selection, a list of request parameters are listed in sub-window 118. As shown in the example, the SNMP version and the particular port are listed as well the type of community string. It will be appreciated that any number of request parameters may be listed. Below the request parameters, sub-window 120 provides a visual list of request templates which defines the data that is to be collected and from where it can be obtained. This list can preferably be edited, e.g., by selecting the "Edit" button as shown.

Examples of the request templates that are not necessarily included in FIG. 10 are MIB-II, which includes detailed network configuration and statistical data; host resources, which includes system hardware configuration, devices, installed software, installed patches etc.; a configuration monitor, which obtains OS configuration details; a software auditor, which obtains data pertaining to installed patches; a base system workload via a system activity reporting (SAR), which obtains hourly and daily performance statistics of basis properties such as CPU, memory, swap etc.; and extended system workload via SAR, which obtains hourly and daily performance data for additional properties including file I/O, swap I/O, page faults etc. It will be appreciated that any number and form of request templates can be used based on the particular strategies being used for a particular environment 12.

The portion 122 of the audit request program 110 displays a list of the audit targets, which are each server 28 that is to be audited. In the example shown, servers A-D are listed and this list can be edited should the user wish to add or remove certain servers 28. Once the user has selected the desired settings and targets etc., they may choose an "Audit" button to begin the audit, or they may cancel the audit and/or save the audit before it runs.

The audit results are acquired by requesting information specified in the selected audit request templates from the servers 28 in the audited environments 50, and the audited data is stored. The data is then accessed by the analysis program 10 and processed to generate reports and display such reports.

Figure 11:
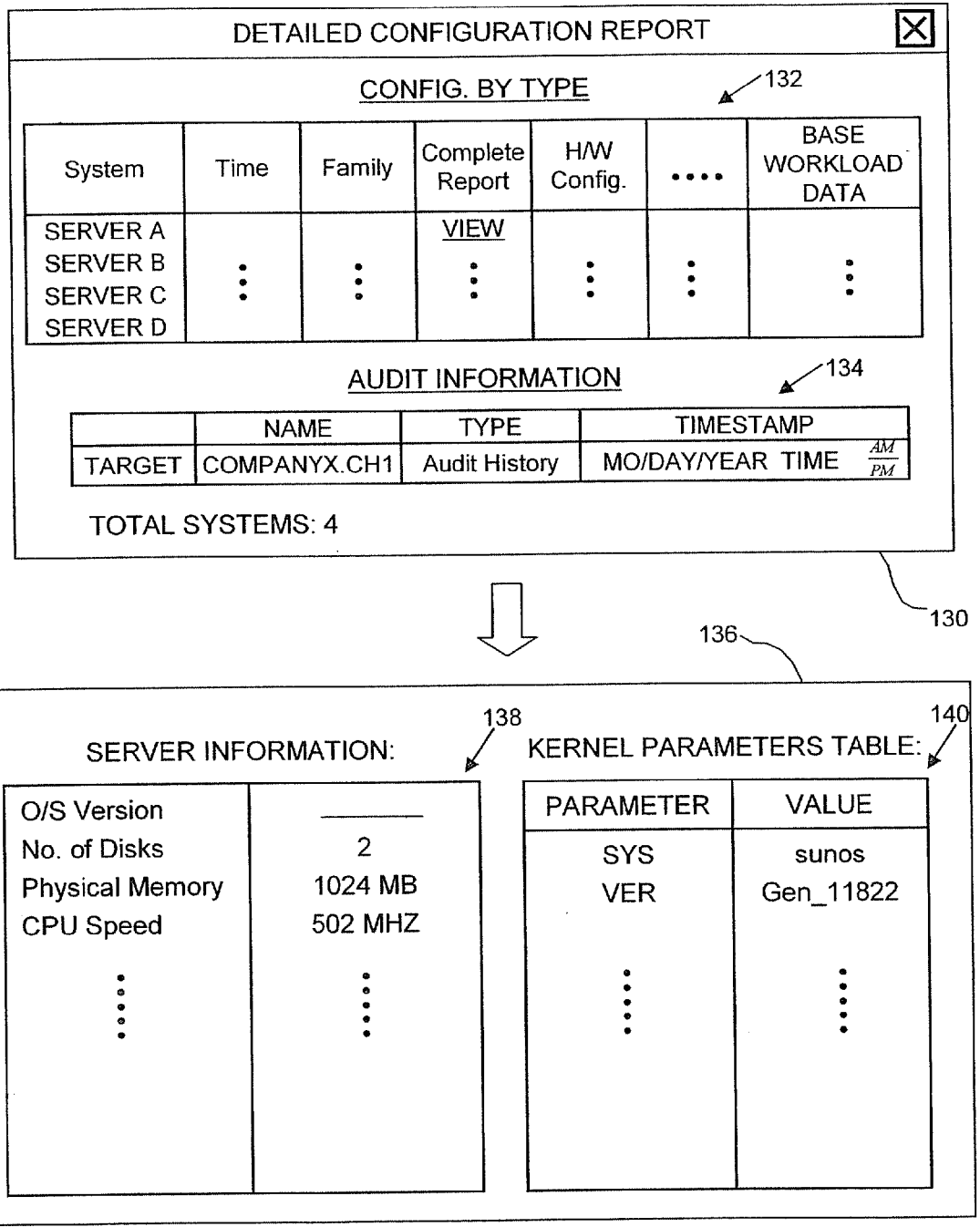
FIG. 11 is a detailed configuration report containing audited configuration data.

A detailed configuration report 130 is shown in FIG. 11. The detailed configuration report organizes the audit data by system and category in the table 132. As shown in FIG. 11, both configuration and workload audit data can be viewed by selecting "View". The report 130 also displays audit information such as the name for the targeted audit, the type of audit and a timestamp indicating when the audit was performed.

Portions of the detailed information that has been collapsed within the configuration report can be viewed by selecting the appropriate "View" link in the report 130. An example of a detailed configuration information table 136 is also shown in FIG. 11. In the example shown, server information 138 and kernel parameters 136 are displayed with detailed data pertaining to the associated settings, kernels etc. An example of a detailed workload data table 145 is shown in FIG. 12. In the example shown in FIG. 12, daily and hourly medium frequency workload data 144 is listed in the table. Each property is listed such as "disk free" and "disk used" along with the corresponding attributes.

The system compatibility analysis, which ultimately generates the SCI matrix 60, compares the detailed configuration settings for the candidate servers 28 with other candidate systems (not shown) based on a pre-defined rule set 43. The resulting analysis yields a system compatibility index score for each candidate server combination. As noted above, these scores are preferably arranged in the graphical SCI 60 format shown in FIG. 6 and sorted using a preferred sorting algorithm as discussed above.

As previously discussed, the analysis program 10 supports multiple rule sets to address a variety of server consolidation strategies and scenarios. Example consolidation rule sets include those for UNIX systems, Windows systems virtualization, SQL servers and Oracle databases. As noted above, each rule specifies the important configuration property that is to be compared between the candidate servers, the criteria for comparison, a relative weight to compute the SCI score, a rule description, and any rule dependencies. Other fields may also be considered such as the source and/or target instance, conditional flags, mutex etc. An example rule set arranged in a table 146 for an arbitrary system is shown in FIG. 13. Each rule and its associated information is listed as a separate entry 148. Various OS settings (not all shown in FIG. 13) are assessed including the OS name, OS version, OS kernel bits, memory size, patch level, name service settings, kernel parameters, locale settings, timezone settings etc.

In this example, total and shared memory criteria tests whether or not the target system has less memory than hypothetical systems that it could be migrated to. If the rule criterion is not explicitly specified, the rule simply checks whether or not the property values of the two systems are different. In general, critical rules are assigned larger weights than less critical rules. As can be seen from FIG. 13, a different operating system is deemed to be more important that a different time zone and thus is given a larger weight. The criticality of a rule may vary from system to system and thus the rule sets should be flexible and configurable.

The SCI score is computed for each candidate system combination by evaluating the rules based on the configuration data obtained from the audit of the environment 12. For each rule that applies to the candidate server pair, the pair's SCI score is reduced by iteratively applying the corresponding rule weight at each iteration (i.e. for each rule), from an initial value to a final value, the final value being the score, A suitable formula for calculating the SCI score is:

$$SCI_{(n+1)} = SCH_n(1-\text{Weight});$$

where $SCI_n$ is the current SCI score (initially 100) before the next rule is evaluated, $SCI_{n+1}$ is the new SCI score, and Weight is the rule weight.

For example for an arbitrary pair of systems, if the following rules: different operating system (weight=0.5); not running the same kernel bits (weight=0.1); and tar-et host has less memory (weight=0.05); were found to apply to a pair of servers 28, the corresponding SCI score would be computed as follows:

$$SCI_1 = 100(1-0.5) = 50$$

$$SCI_2 = 50(1-0.1) = 45$$

$$SCI_3 = 45(1-0.05) = 42.75$$

Final SCI score=42.75.

As can be seen from the example above, where two servers 28 have different operating systems, different kernel bits and the target has less memory than the baseline data, the configuration compatibility for that server pair is quite low. It is therefore unlikely that these servers could be consolidated since they are not compatible at the configuration level.

The compatibility program 10 provides a user interface for performing the overall CHI analysis as shown in FIG. 14. Through such an interface, users can specify the input parameters required to generate the underlying SCI and WCI results to produce the CHI report.

In the example shown in FIG. 14, the program 150 is used to generate a system compatibility report by having the user select an Overall Compatibility Report type to perform the CHI analysis on the selected target systems. An audit that has been saved is loaded into the program 150, which lists identifying information such as the timestamp, number of target servers, and the number of failed evaluations in the table 152. The user can select the report category from the drop-down list 154, e.g. optimization, inventory, change, compliance, administration etc; and can choose the report type from the drop-down list 156. The report parameters 158 may also be selected which are specific to the type of report being generated and define how the report is structured. The target information 162 is also shown and the target can be removed. Once the user has made the appropriate selections, choosing the "Generate" button creates the SCI matrix 60a shown in FIG. 15.

The SCI matrix 60a is presented as an N×N matrix, where the top of each column indicates the server on which each server listed in the first column is consolidated, and the row name indicates the server being migrated. The SCI 60 shown in FIG. 15 provides an example matrix of scores for the example environment 12 including server A to server D. The SCI scores apply to each possible server consolidation pair. The higher scores indicate more compatibility.

As noted above, a group sort can be applied to the SCI matrix 60, which includes a difference calculation. The difference calculation between a pair of systems can be illustrated making reference to the SCI matrix 60a shown in FIG. 15. From this example, the difference between server A and server B may be computed as follows:

$$Diff = sqrt(\text{square}(S(a, a) - S(a, b)) + \text{square}(S(b, a) - S(b, b)) +$$
$$\text{square}(S(c, a) - S(c, b)) + \text{square}(S(d, a) - S(d, b)) +$$
$$\text{square}(S(a, a) - S(b, a)) + \text{square}(S(a, b) - S(b, b)) +$$
$$\text{square}(S(a, c) - S(b, c)) + \text{square}(S(a, d) - S(b, d)))$$
$$= sqrt(\text{square}(100 - 90) + \text{square}(90 - 100) +$$
$$\text{square}(83 - 79) + \text{square}(52 - 52) +$$
$$\text{square}(100 - 90) + \text{square}(90 - 100) +$$
$$\text{square}(83 - 79) + \text{square}(57 - 57))$$

where sqrt represents a square root operation.

The detailed differences shown in FIGS. 16 and 17 can be viewed by clicking on the relevant cell 66. As can be seen in the example, migrating server C to server D yields a score of 57. Selecting this cell accesses the detailed differences table 178 shown in FIG. 17, which shows the important differences between the two systems, the rules and weights that were applied and preferably a remediation cost for making the servers more compatible, the data being collectively referred to by numeral 176. As shown in FIG. 16, a summary differences table 170 may also be presented when selecting a particular cell, which lists the description of the differences 174 and the weight applied for each difference, to give a high level overview of where the differences arise.

The program 150 can also be used to generate a workload compatibility report, which provides a WCI matrix 70a as shown in FIG. 18. While the system compatibility analysis considers the compatibility between systems from a configuration standpoint, the workload analysis assesses the compatibility of two servers from a workload perspective.

The workload analysis computes the WCI scores for the environment 12, in each server combination, similar to the SCI scores. The WCI scores identify the combinations of systems with the most compatibility in consolidating their workloads onto a single machine. This is based on the expected and historical workload patterns for the server and the capacity to take on more work at different times in the pattern.

The workload analysis is performed by making the appropriate selections in the program 150. The program 150, when instructed, uses the workload data collected during the audit. The program 150 allows the user to specify the workload property to analyze (e.g. CPU utilization) and the threshold (or usage limit) 160 to be applied when computing the WCI scores. In the example shown in FIGS. 18 and 19, the WCI scores are penalized when the stacked CPU utilization exceeds 75% of the target server's CPU capability.

The workload compatibility report generates the WCI matrix 70a as an N×N matrix comparing the candidate servers 28. The report provides the WCI score and workload details for each server combination. The WCI matrix columns represent the systems on which the workloads are combined and the rows list the servers being migrated.

It can be seen from the example provided in FIG. 18 that server A can best accommodate the workload of the other servers. In contrast, server C and server D are incompatible from a workload perspective. It should be noted that as seen above, server C and server D were more compatible from a configuration standpoint than a workload. Even with a 100% compatibility in configuration settings, two servers may still score poorly in workload compatibility because they may be sufficiently utilized.

The WCI scores are computed for each server combination, e.g. as follows. The stacked peak workload values for the candidate servers are first computed for the maximum peak ($4^{th}$ quartile) workloads at like times, the maximum peak ($4^{th}$ quartile) workloads at worst times, the maximum sustained ($3^{rd}$ quartile) workloads at like times, and the maximum sustained ($3^{rd}$ quartile) workloads at worst times. When stacking the server workloads comprising data such as CPU utilization, system benchmarks are preferably used to account for relative differences in the candidate servers' workload capabilities (e.g. SPECInt for CPU).

The user-specified workload threshold is then applied to the stacked workload values to derive the workload component scores. The component scores can then be used to calculate the aggregate WCI scores:

Aggregate score =

| | |
|---|---|
| $(0.2 * \text{Peak } 4^{th} \text{ Quartile Like Score})$ | Peak Like Times Score |
| $+(0.1 * \text{Peak } 4^{th} \text{ Quartile Worst Score})$ | Peak Worst Times Score |
| $+(0.4 * \text{Peak } 3^{rd} \text{ Quartile Like Score})$ | Sustained Like Times Score |
| $+(0.3 * \text{Peak } 3^{rd} \text{ Quartile Worst Score})$ | Sustained Worst Times Score |

The above shown weighting, factors are for illustrative purposes only and are preferably flexible. The weighting factors represent the relative importance of peak versus sustained activity in a system 28 and as-measured versus time-shifted patterns.

An example workload compatibility report 180 showing the migration of server B to server C is shown in FIG. 19. The report 180 indicates the inputs such as source server (the one to be stacked), target server (the one being stacked on), the threshold usage limit and normalization parameter(s) in a table 182. A normalization parameter is a number that is indicative of how powerful a system is 18 compared to other systems, and thus normalizes the scores based on the parameter. A WCI computation scorecard 184 is also shown in the report 180, which indicates the value for each quartile, its value and the corresponding score. The aggregate WCI is also provided, which in this example indicates a score of 70. The score (70) is also shown in the WCI matrix 70a shown in FIG. 18. Preferably, by selecting a cell in the WCI matrix 70, access is provided to the underlying calculations and data used to derive the WCI score for the corresponding server pair.

The overall compatibility of the environment 12 for this example is determined by combining the results of the system compatibility and workload compatibility analyses to derive the CHI matrix 80a shown in FIG. 20. The CHI matrix 80a is a report that combines the SCI and WCI scores mathematically. For example, a multiply overlay algorithm can be used which multiplies the cell values together, as well as an "average" of the two scores. It will be appreciated that other algorithms may also be used. In the example shown, the CHI scores are the products of the corresponding SCI and WCI scores. The matrices 60, 70 and 80 can then be arranged in a visual display such as the roadmap 90 or in a single report that creates each matrix and hyperlinks them together.

It can be seen from the matrix shown in FIG. 20 that the most promising consolidation pairs from the above example are server C to server A, server D to server A, server A to server C, and server A to server D. It should be noted when reviewing FIGS. 15, 18 and 20 together that even though server C and server D are very compatible from a configuration standpoint (SCI=90), they are a poor consolidation pair (CHI=35) due to incompatible workloads (WCI=39).

COMMENTARY

Accordingly, a consolidation analysis can be performed and visually represented by performing an audit, performing system compatibility and workload compatibility analyses using the audit data and combining the system and workload analyses to create an overall compatibility co-habitation analyses. It will be appreciated that although the system and workload analyses are performed in this example to contribute to the overall co-habitation analyses, each analysis is suitable to be performed on its own and can be conducted separately for finer analyses. The finer analysis may be performed to focus on the remediation of only configuration settings at one time and spreading workload at another time. As such, each analysis and associated matrix may be generated on an individual basis without the need to perform the other analyses.

It will be appreciated that each analysis and associated matrix may instead be used for purposes other than consolidation such as capacity planning, regulatory compliance, change, inventory, optimization, administration etc. and any other purpose where compatibility of systems is useful for analyzing systems 28. It will also be appreciated that the program 10 may also be configured to allow user-entered attributes (e.g. location) that are not available via the auditing process and can factor such attributes into the rules and subsequent analysis.

It will further be appreciated that although the examples provided above are in the context of a distributed system of servers, the principles and algorithms discusses are applicable to any system having a plurality of sub-systems where the sub-systems perform similar tasks and thus are capable theoretically of being consolidation. For example, a local network having a number of personal computers (PCs) could also benefit from a consolidation analysis.

Although the invention has been described with reference to certain specific embodiments, various modifications thereof will be apparent to those skilled in the art without departing from the spirit and scope of the invention as outlined in the claims appended hereto.

What is claimed is:

1. A method for determining compatibilities for a plurality of computer systems comprising:
    generating a configuration compatibility score for each pair of said plurality of systems based on configuration data obtained for each of said plurality of systems;
    generating a workload compatibility score for each pair of said plurality of systems based on workload data obtained for each of said plurality of systems; and
    generating a co-habitation score for each pair of said plurality of systems using the respective configuration compatibility score and workload compatibility score, said co-habitation score indicating an overall compatibility for each system with respect to the others of said plurality of systems.

2. A method according to claim 1 further comprising generating a graphical interface for displaying said compatibility scores, said graphical interface comprising a matrix of cells, each said cell corresponding to a pair of said plurality of computer systems, each row of said matrix indicating one of said plurality of computer systems and each column of said matrix indicating one of said plurality of computer systems, each cell displaying a compatibility score indicating the compatibility of the respective pair of said plurality of systems indicated in the corresponding row and column, and computed according to predefined criteria.

3. A method according to claim 2 wherein upon selecting said cells, information related to the respective score is provided.

4. A method according to claim 1 further comprising generating a report indicative of said compatibilities according to said compatibility scores.

5. A method according to claim 1 wherein said configuration compatibility score is computed by applying at least one rule set comprising one or more parameters in said configuration data.

6. A method according to claim 5 further comprising assigning a weight to each said parameter indicative of the importance of said parameter to the compatibility of said plurality of systems, said configuration compatibility score being computed for each pair of said plurality of computer systems according to said weights.

7. A method according to claim 5 wherein said configuration compatibility scores are computed by iteratively decrementing an initial value to produce a final value and applying one of said weights at each iteration.

8. A method according to claim 1 wherein said workload compatibility score is computed by computing a stacked workload value for each pair of said plurality of systems at one or more time instance according to said workload data.

9. A method according to claim 8 wherein said stacked workload value is computed according to maximum sustained workloads and maximum peak workloads for each said pair.

10. A method according to claim 9 wherein said stacked workload value considers said maximum sustained workloads at like times and worst times, and considers said maximum peak workloads at like times and worst times.

11. A method according to claim 1 further comprising performing an audit of each of said plurality of systems to obtain said configuration data and said workload data.

12. A method according to claim 1 further comprising stacking said workload data for a plurality of source systems on a target system to virtualize a multi-stacked system, and generating a workload compatibility score for said multi-stacked system based on said stacked workload data.

13. A computer readable storage medium comprising computer executable instructions for determining compatibilities for a plurality of computer systems, said computer readable storage medium comprising instructions for:
    generating a configuration compatibility score for each pair of said plurality of systems based on configuration data obtained for each of said plurality of systems;
    generating a workload compatibility score for each pair of said plurality of systems based on workload data obtained for each of said plurality of systems; and generating a co-habitation score for each pair of said plurality of systems using the respective configuration compatibility score and workload compatibility score, said co-habitation score indicating an overall compatibility for each system with respect to the others of said plurality of systems.

14. A computer readable storage medium according to claim 13 further comprising instructions for generating a report comprising said compatibility scores according to a report template.

15. A computer readable storage medium according to claim 14, further comprising instructions for indicating the type of analysis to be performed and compiled.

16. A computer readable storage medium according to claim 13 wherein said configuration compatibility score is computed by applying at least one rule set comprising one or more parameters in said configuration data.

17. A computer readable storage medium according to claim 13 wherein said workload compatibility score is computed by computing a stacked workload value for each pair of said plurality of systems at one or more time instance according to said workload data.

18. A computer readable storage medium according to claim 13, further comprising instructions for generating a graphical interface for displaying said compatibility scores, said graphical interface comprising a matrix of cells, each said cell corresponding to a pair of said plurality of computer systems, each row of said matrix indicating one of said plurality of computer systems and each column of said matrix indicating one of said plurality of computer systems, each cell displaying a compatibility score indicating the compatibility of the respective pair of said plurality of systems indicated in the corresponding row and column, and computed according to predefined criteria.

19. A method according to claim 2 wherein each said cell comprises a background pattern chosen from a plurality of background patterns based on said compatibility score.

20. A method according to claim 19 wherein said background patterns are different colors, said colors each representing a range of score values.

21. A method according to claim 20 further comprising enabling said range to be selectively changed.

22. A method according to claim 2 wherein said compatibility score is based on one of configuration data, workload data and a combination of configuration and workload data.

* * * * *